US009535537B2

(12) United States Patent
Large et al.

(10) Patent No.: US 9,535,537 B2
(45) Date of Patent: Jan. 3, 2017

(54) HOVER DETECTION IN AN INTERACTIVE DISPLAY DEVICE

(75) Inventors: Timothy Large, Bellevue, WA (US); Karlton Powell, Lake Stevens, WA (US); Steven Bathiche, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 79 days.

(21) Appl. No.: 13/033,529

(22) Filed: Feb. 23, 2011

(65) Prior Publication Data

US 2012/0127128 A1   May 24, 2012

Related U.S. Application Data

(63) Continuation-in-part of application No. 12/949,416, filed on Nov. 18, 2010, now abandoned.

(51) Int. Cl.
 *G06F 3/042* (2006.01)
(52) U.S. Cl.
 CPC ... *G06F 3/0425* (2013.01); *G06F 2203/04101* (2013.01); *G06F 2203/04109* (2013.01)
(58) Field of Classification Search
 CPC ............................... G06F 3/042; G06F 3/041
 USPC ...... 345/175, 173, 174, 156, 32, 690, 8, 633
 See application file for complete search history.

(56) References Cited

U.S. PATENT DOCUMENTS

| 5,629,785 | A | 5/1997 | Valliath et al. |
| 5,644,369 | A | 7/1997 | Jachimowicz et al. |
| 6,504,629 | B1 | 1/2003 | Popovich et al. |
| 7,205,983 | B2 | 4/2007 | Raap et al. |
| 7,583,423 | B2 | 9/2009 | Sutherland et al. |
| 8,730,129 | B2 * | 5/2014 | Solomon ............. G02B 26/105 345/32 |

(Continued)

FOREIGN PATENT DOCUMENTS

| CN | 1563899 A | 1/2005 |
| CN | 101821703 A | 9/2010 |

(Continued)

OTHER PUBLICATIONS

The State Intellectual Property Office of China, First Office Action and Search Report Issued in Chinese Patent Application No. 201210041836.7, Dec. 2, 2015, China, 15 pages.

(Continued)

*Primary Examiner* — Thuy Pardo
(74) *Attorney, Agent, or Firm* — Qudus Olaniran; Judy Yee; Micky Minhas

(57) ABSTRACT

Embodiments are disclosed that relate to hover detection in interactive display devices. One embodiment provides an interactive display device comprising a display panel configured to display an image on an interactive surface, an imaging optical wedge disposed adjacent to the display panel, an image sensor configured to capture an image of an object located in front of the interactive surface and spaced from the interactive surface by capturing the image through the imaging optical wedge, a logic subsystem, and a data-holding subsystem comprising instructions executable by the logic subsystem to operate the display panel and the image sensor, and to detect a hover input based upon one or more images received from the image sensor.

15 Claims, 10 Drawing Sheets

(56) References Cited

U.S. PATENT DOCUMENTS

| | | | |
|---|---|---|---|
| 2007/0018943 A1 | 1/2007 | Bayrle et al. | |
| 2008/0029691 A1 | 2/2008 | Han | |
| 2008/0088593 A1 | 4/2008 | Smoot | |
| 2008/0198143 A1 | 8/2008 | Kinoshita et al. | |
| 2008/0284925 A1 | 11/2008 | Han | |
| 2009/0091553 A1* | 4/2009 | Keam | G06F 3/0423 345/175 |
| 2009/0102763 A1 | 4/2009 | Border et al. | |
| 2009/0201571 A1 | 8/2009 | Gally et al. | |
| 2009/0219253 A1* | 9/2009 | Izadi | G06F 3/0421 345/173 |
| 2009/0244300 A1 | 10/2009 | Levin et al. | |
| 2009/0322794 A1* | 12/2009 | Lowe | G09G 3/20 345/690 |
| 2010/0073326 A1* | 3/2010 | Keam | G06F 3/0425 345/175 |
| 2010/0088078 A1 | 4/2010 | Geehan et al. | |
| 2010/0295820 A1* | 11/2010 | Kikin-Gil | G06F 3/0421 345/175 |
| 2010/0302209 A1 | 12/2010 | Large | |
| 2011/0019056 A1 | 1/2011 | Hirsch et al. | |
| 2011/0115747 A1* | 5/2011 | Powell et al. | 345/175 |
| 2012/0120030 A1* | 5/2012 | McCarthy et al. | 345/175 |
| 2012/0127127 A1* | 5/2012 | Large et al. | 345/175 |
| 2012/0218301 A1* | 8/2012 | Miller | G02B 27/017 345/633 |
| 2012/0235883 A1* | 9/2012 | Border | G02B 27/0093 345/8 |

FOREIGN PATENT DOCUMENTS

| | | |
|---|---|---|
| CN | 101971123 A | 2/2011 |
| JP | 2010157210 A | 7/2010 |
| KR | 1020090060283 A | 6/2009 |
| KR | 1020100088680 A | 8/2010 |
| WO | 2009158209 A2 | 12/2009 |
| WO | 2010088078 A2 | 8/2010 |
| WO | 2011011008 A1 | 1/2011 |

OTHER PUBLICATIONS

Taiwan Intellectual Property Office, Office Action and Search Report Issued in Taiwan Patent Application No. 101104432, Dec. 16, 2015, Taiwan, 13 pages. (Submitted with translation of Search Report).
"Microsoft Research: D. Alex Butler," Microsoft Corporation, http://research.microsoft.com/en-us/um/people/dab/default.aspx, Accessed Aug. 25, 2010, Available as early as Aug. 17, 2010, 10 pages.
Izadi et al., "Going Beyond the Display: A Surface Technology with an Electronically Switchable Diffuser," Proceedings of the 21st Annual ACM Symposium on User interface Software and Technology, Oct. 19, 2008, pp. 269-278.
"Science Simplifying Complexity," Microsoft Applied Sciences Group, http://www.microsoft.com/appliedsciences/, Accessed Aug. 26, 2010, Available as early as Oct. 30, 2009, 2 pages.
Walker et al., "Beneath the Surface," Information Display Magazine, vol. 26, Mar. 2010, pp. 32-34.
Dr. Holliman, Nick, "3D Display Systems", Retrieved at << http://citeseerx.ist.psu.edu/viewdoc/download?doi=10.1.1.15.2146&rep=rep1&type=pdf >>, Nov. 8, 2002, p. 1-46.
Hirsch, Matthew et al., "Bidi Screen: A Thin, Depth-Sensing LCD for 3D Interaction Using Light Fields," Published in ACM Transations on Graphics, 2009, vol. 28, <http://web.media.mit.edu/~mhirsch/bidi/>, 9 pages.
State Intellectual Property Office of China, Notice of Allowance of CN201110393806.8, Dec. 3, 2014, 3 pages.
State Intellectual Property Office of the People's Republic of China, Second Office Action issued in CN201110393806.8, Sep. 2, 2014, 10 pages.
"International Search Report", Mailed Date: Dec. 21, 2012, Application No. PCT/US2012/025833, Filed Date: Feb. 21, 2012, pp. 8.
Izadi, S. et al., "C-Slate: A Multi-Touch and Object Recognition System for Remote Collaboration using Horizontal Surfaces," Second Annual IEEE International Workshop on Horizontal Interactive Human-Computer Systems (Tabletop 2007), Oct. 2007, Newport, Rhode Island, 8 pages.
State Intellectual Property Office of the People's Republic of China, Second Office Action and Search Report Issued in Chinese Patent Application No. 201210041836.7, Jul. 12, 2016, 10 pages.
European Patent Office, Extended European Search Report Issued in Application No. 12749756.8, Sep. 28, 2016, Germany, 11 pages.

* cited by examiner

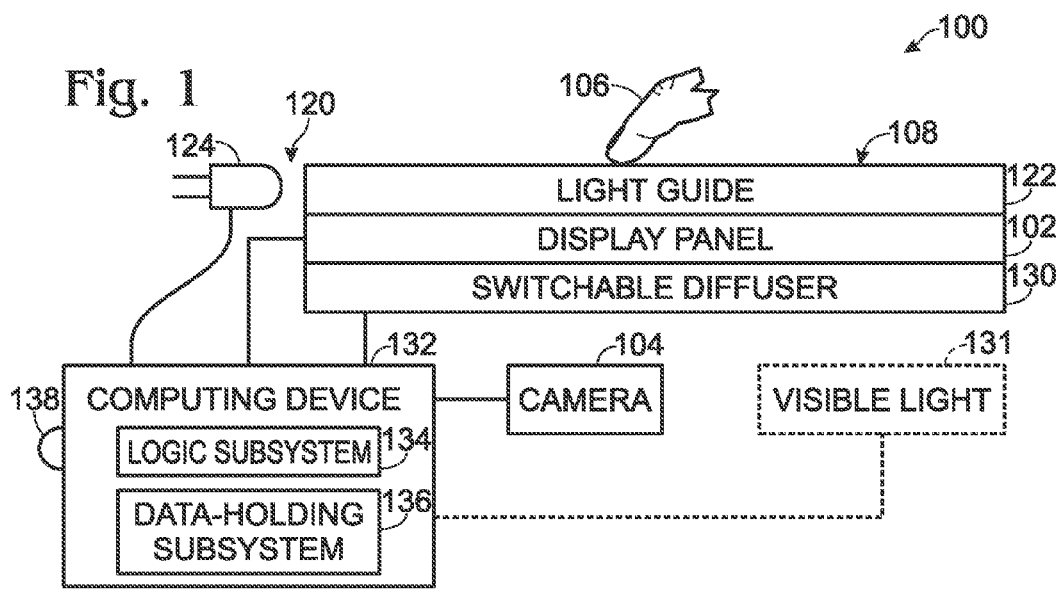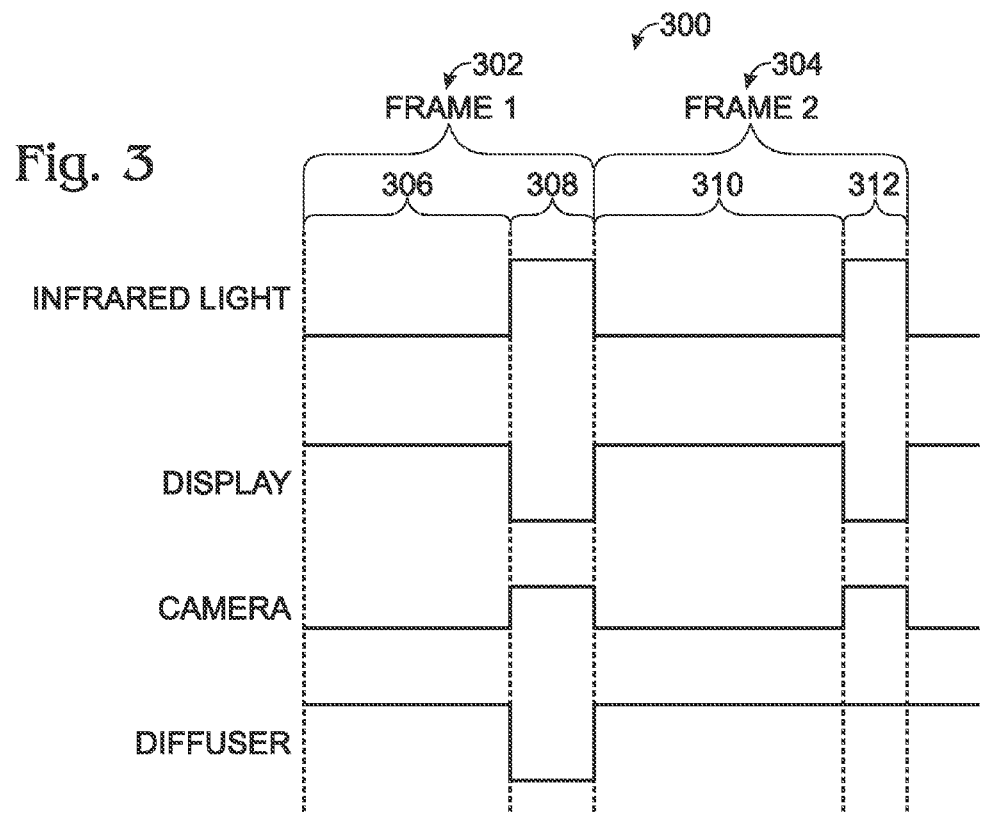

HOVER DETECTION IN AN INTERACTIVE DISPLAY DEVICE

CROSS-REFERENCE TO RELATED APPLICATIONS

This application is a continuation-in-part of and claims priority to U.S. patent application Ser. No. 12/949,416, titled VARIABLE LIGHT DIFFUSION IN INTERACTIVE DISPLAY DEVICE and filed Nov. 18, 2010, the entire disclosure of which is hereby incorporated by reference.

BACKGROUND

An interactive display device, such as surface computing device, may be configured to allow a user to interact with the device via a touch-interactive display surface, rather than, or in addition to, peripheral input and output devices such as keyboards, cursor control devices, and monitors. A variety of touch-sensing mechanisms may be used to sense touch in an interactive display device, including but not limited to capacitive, resistive, and optical mechanisms. An optical touch-sensing mechanism may utilize one or more cameras to acquire images of the touch-sensitive surface, thereby allowing the detection of fingers and other objects touching the touch-sensitive surface in such images.

SUMMARY

Embodiments are disclosed that relate to hover detection in interactive display devices. For example, one disclosed embodiment provides an interactive display device comprising a display panel configured to display an image on an interactive surface, an imaging optical wedge disposed adjacent to the display panel, an image sensor configured to capture an image of an object located in front of the interactive surface and spaced from the interactive surface by capturing the image through the imaging optical wedge, a logic subsystem, and a data-holding subsystem comprising instructions executable by the logic subsystem to operate the display panel and the image sensor, and to detect a hover input based upon one or more images received from the image sensor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 shows a schematic depiction of an embodiment of an interactive display system comprising a variable diffuser.

FIG. 3 shows a timing diagram depicting a non-limiting example implementation of the embodiment of FIG. 2.

DETAILED DESCRIPTION

Figure 2:
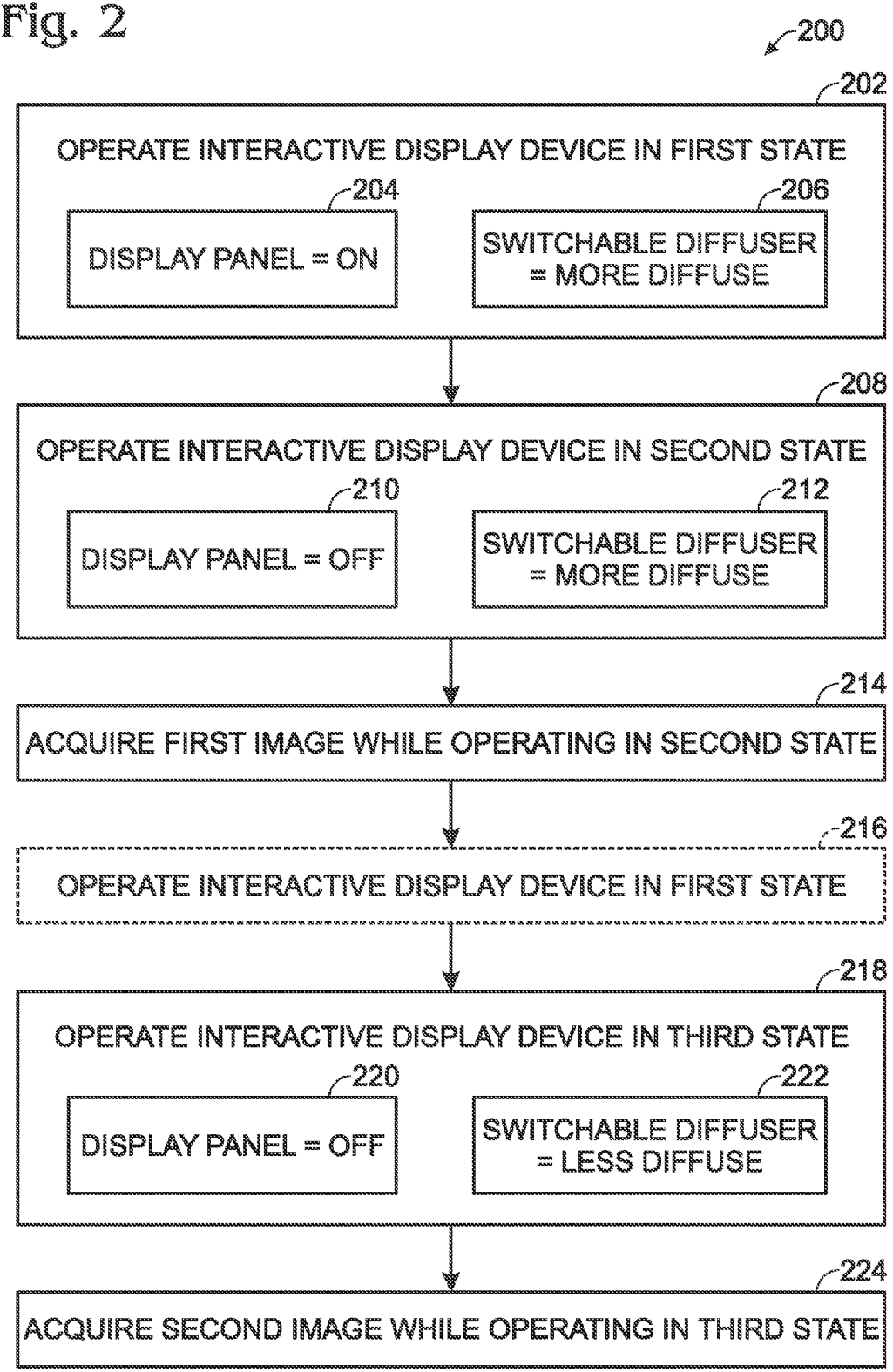
FIG. 2 shows a flow diagram depicting an embodiment of a method of operating an interactive display system comprising a variable diffuser.

Embodiments are disclosed herein that relate to the detection of hover inputs in an interactive display device, and also that relate to the use of variable diffusers in interactive display devices. The term "hover" is used herein to describe gestures and/or postures performed above, but not in contact with, an interactive surface that can be detected by the interactive display device, allowing a response to a hover event to be displayed on the interactive display device. FIG. 1 shows an embodiment of an interactive display device 100 comprising a display panel 102 configured to display an image to a user. The interactive display device 100 also comprises an image sensor 104 configured to acquire images of an interactive surface 108 to detect a touch input, for example, by a user's finger 106 and/or by other objects on or over the interactive surface 108. As such, where the image sensor 104 is positioned optically behind the display panel 102 from the perspective of a user, the image sensor 104 may be configured to detect light of a wavelength that passes through the display panel regardless of a state of the image-producing material of the display panel.

As more specific examples, where the display panel 102 is a liquid crystal display (LCD), the camera may be configured to capture images in the near infrared spectrum, as light in the near infrared spectrum may pass through an LCD panel regardless of the state of the liquid crystal material in each pixel. Further, since an LCD may be equipped with RGB filters, the camera may be configured to capture images in the visible spectrum, by driving the display with content which makes the display transparent for each of the RGB cells within each pixel. In addition, both IR images and color images may be captured by the camera system through varying the configuration of the visible backlight, display content, and the image capturing system over time. Likewise, where the display panel 102 is an organic light-emitting device (OLED), the camera may be configured to detect light from near IR to near UV wavelengths, or a simultaneous combination of wavelengths such as in the case of a color image. It will be understood that the term "interactive surface" may in some embodiments comprise a surface with which a user may interact by touch, postures, gestures, hover, and/or other interactions performed on or over the surface. While the depicted image sensor is located on an opposite side of the display panel as the light guide, it will be understood that the image sensor may be located in any other suitable position. For example, the image sensor may be integrated into the display panel as a sensor-in-pixel (SIP) arrangement in some embodiments.

The image sensor may comprise a two-dimensional (2D) image sensor, or a three-dimensional (3D) image sensor configured to sense depth. Further, in some embodiments, two or more image sensors may be utilized. For example, two 2D image sensors may be used cooperatively as a stereo depth sensor. Likewise, separate 2D and 3D image sensors may be utilized to detect gestures performed at different distance ranges from the interactive surface. Examples of such embodiments are described in more detail below.

It also will be understood that the display panel may be any suitable array-based display panel including but not limited to an emissive display such as a transparent OLED or other OLED, and/or a light modulating display such as an LCD panel, an electrowetting display (transparent type), MEMS aperture array, etc. A color electrowetting display may be configured to operate either with "on" pixels or "off" pixels displaying color. Where color is displayed by "on" pixels, a black oil may be used so that an "off" pixel is black & absorbs all light and color filters absorb a portion of white light in "on" pixels to produce color. Where color is displayed by "off" pixels, colored dyes may be used in the electrowetting material such that the "off" state has color. In colored dye electrowetting displays, the display states are levels in between filtered light for display 'on'/electrode-'off' and open, non-filtered light for display 'on'. In such a panel, dyes for each color may be selected to exhibit IR transmission and visible filtration to allow a vision-based touch detection system to see through such a panel.

With the device of FIG. 1, multiple temporally overlapping touches may be detected and tracked on the interactive surface 108. While the depicted interactive display device 100 utilizes a display panel to display an image to a user, any other suitable display mechanism, including a projection mechanism, may be used. Further, it will be understood that various optics, including but not limited to wedge optics (e.g. an optical wedge placed behind the display panel), lenses, Fresnel lenses, mirrors, and/or filters, may be used to deliver an image to the image sensor 104.

To aid in detecting objects touching the interactive surface 108, the interactive display device 100 comprises a front lighting system 120 comprising a light guide 122 and an illuminant 124 configured to introduce infrared light into the light guide 122, and also comprises a variable diffuser 130. The light guide 122 may have any suitable configuration. For example, in some embodiments, the light guide 122 helps facilitate touch detection via Frustrated Total Internal Reflection (FTIR). In FTIR systems, the presence of a dielectric material within close proximity (e.g. less than half a wavelength) of the light guide 122 causes light to leak out of the waveguide into the material. Wetting caused, for example, by oils, greases, or pressure applied to very soft materials like silicone rubber, also may cause the same leakage effect. Thus, when a finger or other object touches light guide 122, light leaks out into the finger and is scattered, and some of the scattered light returns through the waveguide to image sensor 104.

FTIR systems in which the user directly touches the light guide ("naked" FTIR systems), may suffer some drawbacks. For example, light in such systems may be scattered by residual fingerprint oil, smudges due to accidental spills or splatter by users, or poor cleaning. Further, there may be wide variations in signal level from person to person, depending upon skin tone.

Other FTIR systems, which may be referred to as "covered" FTIR systems, include a barrier layer between the skin and the waveguide. In some systems, the barrier layer may serve a secondary function as a projection screen upon which an image is projected from behind.

In yet other embodiments, in order to detect objects not in contact with the surface, the light guide 122 may be made "leaky" by adding a controlled diffusion to one or both of the top and bottom surfaces of the light guide. Thus, even in the absence of a touch, some light escapes from the light guide thereby illuminating objects and allowing the vision system to detect objects that are not in contact with the surface. It will be understood that backlighting systems, in which the illuminant is located behind the display panel relative to the interactive surface, also may be used to illuminate objects for detection.

The variable diffuser 130 is configured to be electronically switchable between two or more states that comprise at least a more diffuse state and a less diffuse state. In some embodiments, the variable diffuser 130 may comprise a diffusivity that is controllable along a continuum between clear and highly diffuse. In such embodiments, the terms "more diffuse" and "less diffuse" may signify any states of the variable diffuser that have a greater and lesser diffusivity relative to one another. In other embodiments, the variable diffuser 130 may have two or more discrete states, and the terms "more diffuse" and "less diffuse" may signify any discrete states having a greater and lesser diffusivity relative to one another. Further, the variable diffuser also may be segmented, such that the diffusivity of different regions of the variable diffuser may be independently controlled. Any suitable material may be used to form the variable diffuser, including but not limited to a Polymer-Dispersed Liquid Crystal (PDLC) material. While shown in FIG. 1 as being positioned behind the display panel from the perspective of a user, it will be understood that, in other embodiments, the variable diffuser may be located on a same side of the display panel as a user, as described below.

The variable diffuser 130 may perform various functions in the interactive display device 100, depending upon the nature of the display panel used. For example, where the display panel 102 is an LCD panel, the variable diffuser may be used in conjunction with a visible light source 131 configured to illuminate the variable diffuser to thereby backlight the LCD panel. In such a configuration, the variable diffuser 130 may be switched to a more diffuse state while an image is displayed by the display panel 102, and to a less diffuse state when an image is being acquired by the image sensor 104. In such embodiments, the visible light source 131 may be switched off whenever the variable diffuser 130 is in a less diffuse state. Likewise, in embodiments where the display panel 102 is an OLED panel, the variable diffuser may help to hide internal components of the interactive display device 100 when an image is being displayed and when the image sensor 104 is not integrating an image.

Note that in some embodiments, an IR image may be captured at the same time that the display is displaying an image and the backlight is turned on, by making use of wavelength selective filters, in this case an IR transmissive and visibly opaque filter, as described in more detail below.

The interactive display device 100 further comprises a computing device 132 having a logic subsystem 134, and also having a data-holding subsystem 136 comprising instructions stored thereon that are executable by the logic subsystem 134 to perform the various methods disclosed herein. In particular, the methods and processes described herein may be implemented as a computer application, computer service, computer API, computer library, and/or other computer program product. Computing device 132 is shown in simplified form. It is to be understood that virtually any computer architecture may be used without departing from the scope of this disclosure.

The logic subsystem 134 may include one or more physical logic devices configured to execute one or more instructions. For example, the logic subsystem 134 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 134 may include one or more processors that are configured to execute software instructions. Additionally or alternatively, the logic subsystem 134 may include one or more hardware or firmware logic machines configured to execute hardware or firmware instructions. Processors of the logic subsystem 134 may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

The data-holding subsystem 136 may include one or more physical, non-transitory, devices configured to hold data and/or instructions executable by the logic subsystem to implement the herein described methods and processes. When such methods and processes are implemented, the state of the data-holding subsystem 136 may be transformed (e.g., to hold different data).

The data-holding subsystem 136 may include removable media and/or built-in devices. The data-holding subsystem 136 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem 136 may include devices with one or more of the following characteristics: volatile, nonvolatile, dynamic, static, read/write, read-only, random access, sequential access, location addressable, file addressable, and content addressable. In some embodiments, the logic subsystem 134 and the data-holding subsystem 136 may be integrated into one or more common devices, such as an application specific integrated circuit or a system on a chip.

FIG. 1 also shows an aspect of the data-holding subsystem in the form of computer-readable storage media 138, which may be used to store and/or transfer data and/or instructions executable to implement the herein described methods and processes. Computer-readable storage media 138 may take the form of CDs, DVDs, HD-DVDs, Blu-Ray Discs, EEPROMs, and/or floppy disks, among others. Computer-readable storage media 138 is distinguished herein from computer-readable communications media configured to transmit signals between devices.

The term "program" may be used to describe an aspect of computing device 132 that is implemented to perform one or more particular functions. In some cases, such a module, program, or engine may be instantiated via the logic subsystem 134 executing instructions held by the data-holding subsystem 136. It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The term "program" is meant to encompass individual or groups of executable files, data files, libraries, drivers, scripts, database records, etc.

Continuing, in the embodiment of FIG. 1, the variable diffuser is placed optically between the display panel 102 and the image sensor 104 or other image capture device. FIG. 2 illustrates an embodiment of a method 200 of operating an interactive display device having such a configuration. Method 200 comprises, at 202, operating the interactive display device in a first state in which the display panel is on ("on" indicates that the display panel is displaying an image), as indicated at 204, and the variable diffuser is in a more diffuse state, as indicated at 206. In this state, the variable diffuser may be used as a backlight in embodiments where the display panel is a LCD panel, and may help to block a user's view of internal components of the interactive display system where the display panel is an OLED or LCD panel.

Next, method 200 comprises, at 208, operating the interactive display device in a second state in which the display panel is off ("off" indicates that the display panel is not displaying an image), as indicated at 210, and the variable diffuser is in a more diffuse state, as indicated at 212. While operating the interactive display device in the second state, method 200 further comprises, at 214, acquiring a first image with the image capture device.

Continuing, method 200 may optionally comprise, at 216, again operating the interactive display device in the first state before operating the interactive display device in a third state at 218, or may proceed directly to the third state without operating again in the first state. In the third state, the display panel is in an "off" state, as indicated at 220, and the variable diffuser is in a less diffuse state, as indicated at 222. Method 200 further comprises, while operating the interactive display device in the third state, acquiring a second image with the image capture device, as indicated at 224.

The first and second images may then be used to distinguish objects touching or closer to the interactive surface of the interactive display device from objects located farther away from the interactive surface. For example, objects close to the surface may appear sharply defined in both images, whereas objects off the surface may be sharply defined only in the second image (acquired when the variable diffuser was in the less diffuse state). Further, by comparing the gradient content of the images, proximity of the object may be measured, and touch events determined. For determining touch, in one scenario the first image alone may be used to determine proximity, while in another scenario both the first and second images may be used.

It will be understood that, in some embodiments, images may be captured at a range of variable diffuser states between a fully "off" state and a fully "on" state (e.g. where the variable diffuser is transparent to incident light and where the variable diffuser is completely diffuse to incident light), potentially at any state anywhere in between these two extremes. This may allow the calculation of a distance an object is away from the screen by looking at how "in focus" the objects are, wherein objects farther from the display remain blurry for longer than objects closer to the display as the variable diffuser is changed from more diffuse to less diffuse. By utilizing a sufficient number of images at such intermediate diffusivity states, a three-dimensional image of an object may be constructed as parts of the object come into focus along the z-axis (e.g. normal to the display screen plane) as the diffusivity of the variable diffuser is decreased. Such a method also may be used in combination with other hover detection methods, including but not limited to those discussed below, to disambiguate a hover detection process (e.g. to distinguish motion-derived blur from distance-derived blur).

It will be understood that different variable diffusers may have different effects on light distribution as diffusivity is varied. For example, some variable diffusers may vary a spread angle, such as a variable diffuser having Gaussian intensity angular output profile width, such that angular subtend changes but the profile shape is essentially maintained. Other variable diffusers, such as a PDLC, may be variable volume scatterers, in which case there is a $0^{th}$-order response present, over a scattered-light shoulder profile, which diminishes upon increase of diffuse strength until all the energy is scattered into the angular distribution output profile, the shoulder (portion of light energy scattered into exit envelope angular output profile due to partially diffuse PDLC) of which may have profile shape which is substantially constant versus increase in diffuse strength. In the former case, "variable" may imply changing angular spread while maintaining a given output shape, such as Gaussian profile. One may envision achieving such functionality via a bumpy surface relief structure having ability to electrically induce an index change thus an output angle change. While it may be feasible in the form of an electrically active liquid crystal screen device having 'bumpy' surface, there may be difficulties and additional requirements including polarization maintenance in such case.

As PDLC devices are in the latter category of volume scattering, their scattering effect involves forming a broad angular output profile 'shoulder' with a peak $0^{th}$ order response in the center.

As such, attempting to determine a hover distance from diffuse images may imply use of intensity profile information as well as gradients, which may take into account effects such as ambient light and objects behind other objects. As one example of how a diffusivity profile may allow a determination of hover distance, and not considering additional computational time constraints due to use of computations involving deconvolutions, the diffuse profile may be used to deconvolute the image by a predetermined diffuse profile of the current partially or fully diffuse state. Two options become apparent. First, for a given diffuser, it is known that the blur on the object is dictated by the angular profile of the diffuser and the z distance. When the image is deconvoluted with a series of scaled profiles, representing the angular blur expected to be imparted on an object within the image for various distinct z distances, portions of the image within the deconvoluted image which result in achieving a given range of gradients (i.e. diffuse blur removed, so not excessively blurry, yet not having substantial transient edge overshoot common to excessive sharpening), regions of the image may be assigned z values based on the deconvoluted image achieving the optimum result. In such manner, the image may be swept through the series of deconvolutions, assigning merit to level of deblur for each region of pixels having a high contrast object edge, for each deconvolution in the series. As a second method, for the case where diffuse shape is consistent but scales with object z distance, the deconvolution profile may be fixed for a given nominal case, and the actual diffuser may vary in diffuse strength to achieve a series of images. The deconvolution of the image, which results in an expected range of gradients near a high contrast object edge, may then be assigned relatively higher merit than those resulting in excessive blur or excessive edge ringing transient edge response. In this manner, blur arising from hover distance may be distinguished from blur arising from motion. As these methods use intensity profile information, they may take into account such factors as ambient light, objects behind other objects, motion blur (which may be handled by looking for edge response in orthogonal dimensions), and camera sensor nonlinearity in response, which may be accounted for via mapping.

In a similar manner, gestures and/or postures performed above the interactive surface, as opposed to on the interactive surface, also may be detected. Using the above-described methods, even z-axis motion may be detected with the use of a sufficiently fast image sensor and variable diffuser. Additionally, a hand or other object hovering at height above interactive surface may be tracked, so as to maintain a state of a touch event (or non-touch state) due to a finger/digit associated with that hand. This may enable tracking of a distinction of one hand from another, and even potentially one user from another, so that the interactive display device may maintain a given mode of operation based on whether or not a touch event is associated with the same hand which provided a previous touch event.

For the case of image capture device being within the panel such as in an SIP arrangement, or 'in-cell' panel device, defocus of images of objects significantly above the interactive surface may increase significantly with distance from the interactive surface. While the range over which a given level of resolvability may be increased by use of an angularly selective filter, (e.g. an interference based filter), such imaging panels may not image well beyond a few mm above the surface. Thus, to enable hover detection with such systems, an additional vision system may be used to image through the panel, in a similar fashion as described in the LCD scenario. The vision system may include, but is not limited to, components such as an imaging wedge, a rear camera and lens, a folded imaging system, and/or Fresnel-based offset imaging optics, as described in more detail below.

In such case, the through-panel imaging system may be used to achieve images beyond the interactive surface, while the SIP sensor array may be used to detect touch or image objects at the interactive surface. Since a SIP sensor may be equipped with sensors capable of sensing visible light as well as IR light, the SIP panel may be used to detect touch in some scenarios while capturing objects at interactive surface more appropriate with other wavelengths of light. While the SIP panel may be equipped with multiple arrays of sensors each having different wavelength response in order to capture color information across the spatial domain, it may be that such panel may be only equipped with visible and IR sensor arrays, in some embodiments. However as an example system, in such embodiment, it is further possible to capture a color image of both objects at the surface as well as above the surface by using a combination of image information from both image capture sub-systems. For example, contrast of an object from SIP sensor array may indicate the object is at the surface, and a through-panel imaging system may be used to achieve an image of the same object in color using a color imaging camera, for example, by imaging through an LCD panel while the panel is driven 'white'. In such case, SIP is used to detect proximity of objects and touch events to interactive surface while through-panel imaging sub-system is used to capture more resolved images, and even color images, of both objects at surface as well as objects above surface, or gestures and hover.

FIG. 3 shows a timing diagram 300 depicting more detailed, non-limiting example implementation of method 200. A first display image frame cycle is shown at 302, and a second display image frame cycle is shown at 304. The timing diagram 300 shows relative changes of state of an infrared light that provides light to a front lighting touch detection system, a display panel, a camera, and a variable diffuser. It will be understood that, in embodiments that utilize a LCD panel, a visible light may be modulated in a similar pattern to that of the display panel to provide backlighting for the display panel.

First referring to the first frame cycle 302, the infrared light and camera are in "off" states for a first portion 306 of the first frame cycle 302, while the display is in an "on" state and the variable diffuser is in a more diffuse state. Thus, the first portion 306 of the first frame cycle 302 displays an image. Next, in a second portion 308 of the first frame cycle 302, the infrared light is in an "on" state, the display panel is in an "off" state, the camera is in an "on" state (i.e. is integrating an image), and the diffuser is in a less diffuse state. Thus, the second portion 308 of the first frame cycle 302 may be used to acquire a less diffuse image of any objects touching or close to the interactive surface.

Next referring to the second frame cycle 304, the infrared light and camera are in "off" states for a first portion 310 of the second frame cycle 304, while the display is in an "on" state and the variable diffuser is in a more diffuse state. Thus, the first portion 310 of the second frame cycle 304 displays an image. Next, in a second portion 312 of the second frame cycle 304, the infrared light is in an "on" state, the display panel is in an "off" state, the camera is in an "on" state, and the diffuser is in a more diffuse state. Thus, the second portion 312 of the second frame cycle may be used to acquire a more diffuse image of any object touching or close to the interactive surface. Then, the images acquired during the first frame cycle and second frame cycle may be compared to determine whether an object is touching the interactive display surface. Further, as noted above, by comparing the gradients between pixels in the two acquired images, a distance of an object above the surface may be determined. It will be understood that, in some embodiments, depending on frequency response of the variable diffuser and the frame rate of the camera, the more diffuse image may be acquired during the time that the display is on, if a wavelength selective optical filter is utilized to filter out display light content into the imaging system, and the infrared light source is turned on for that time of exposure. It will further be noted that, in some embodiments, touch may be detected from only one of the two images, and/or an image may be acquired during only one of the three states illustrated in FIG. 3.

The first portion and second portion of each frame cycle of FIG. 3 may have any suitable duration. In one non-limiting example embodiment, the first portion of each frame cycle may comprise 80% of each frame cycle, and the second portion of each frame cycle may comprise 20% of each frame cycle. This may lead to an image of satisfactory brightness, yet provide ample time to integrate images of a desired quality when the display screen is in an "off" state.

As mentioned above, in some embodiments, an IR image may be captured at the same time that the display is displaying an image and the backlight is turned on, by making use of wavelength selective filters, such as an IR transmissive and visibly opaque filter. As a more specific example, in one embodiment, an interactive display device may operate in a first state in which the display panel is in an ON state and the variable diffuser is in the more diffuse state, and then operate in a second state in which the display panel is in an ON state and the variable diffuser is in the less diffuse state. Moreover, the interactive display device may acquire a first image while operating in the second state, and acquire a second image while operating in the first state. The infrared-transmissive filter may help prevent visible light from the display that is reflected by the object from reaching the image sensor. Then, either or both of the first and second images may be used to detect touch, hover, etc., as described herein. Further, a single image may be used to detect touch in some embodiments.

In some embodiments, it may be desired to account for the ambient lighting environment surrounding the interactive display device. Therefore, in such embodiments, the camera may be exposed for a time during which the infrared lights are in an "off" state. This may be performed while the display panel is in an "on" state, with the use of a wavelength selective filter to filter out display content light. Likewise, an occasional cycle in which the display panel and infrared lights are both in the "off" state may be used for ambient detection. It will be understood that, once an ambient light level has been determined, the operation of the interactive display device may be adjusted in any suitable manner to compensate for ambient light conditions.

The ambient correction mechanism employed may depend upon the manner of operation of a particular device. For example, in some embodiments, an interactive display device may capture the first image with the variable diffuser in more diffuse state and while the display is in an "on state" by using an infrared filter to filter out the display light from the image. In this case, only two states are utilized in the operational sequence in order to capture the two diffuser states, since the first image is captured at the same time that the display is on, and the second image is captured when display is off and in the less diffuse state. To compensate for ambient in this scenario, additional images may be captured with IR lights off in one or both diffuser states.

Figure 4:
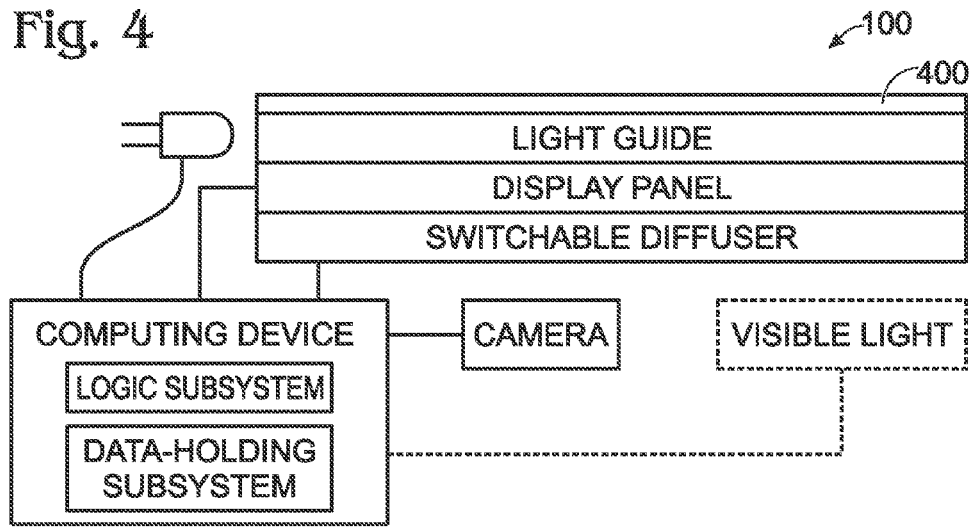
FIG. 4 shows a schematic depiction of an embodiment of an interactive display system comprising a variable diffuser and a protective layer.

It will be noted that ambient light may appear differently within an image depending on whether the diffuser is in less diffuse or more diffuse state. In such case, ambient may be compensated by capturing images with IR lights off within the timeframe of each of the two states. Further, it will be understood that timing windows for each state are not required to fully fill the timing window allotted by sequence. For example, in some cases, camera integration time may be delayed to begin shortly after the beginning of the integration window in order to allow time for the variable diffuser to fully change state. Allowance for such effects as rise and fall time may serve to improve the distinction of each captured state.

Where the light guide of the front light touch detection system is configured to leak out light even in the absence of a touch, touch may be detected without FTIR events. Thus, in some embodiments, touch may be detected purely from infrared light leaked from the front lighting system, rather than from FTIR events. In such embodiments, FTIR events may be avoided by placing a protective layer, such as a thin sheet of glass, over the front-light. FIG. 4 illustrates such a protective layer 400 added to the interactive display device 100 of FIG. 1. The user of such a protective layer may help to greatly reduce the effect of fingerprint oil, smudges, poor cleaning, and other such factors on the system. The use of a thin protective layer, as opposed to a thicker layer, may help to preserve sharpness of the more diffuse state images acquired by the camera, and also may help to avoid introducing undesirable levels of parallax between touch and display. Examples of suitable materials for the formation of such a protective layer include, but are not limited to, treated or hardened glass, such as Gorilla Glass, available from the Corning Inc. of Corning, N.Y.

Figure 5:
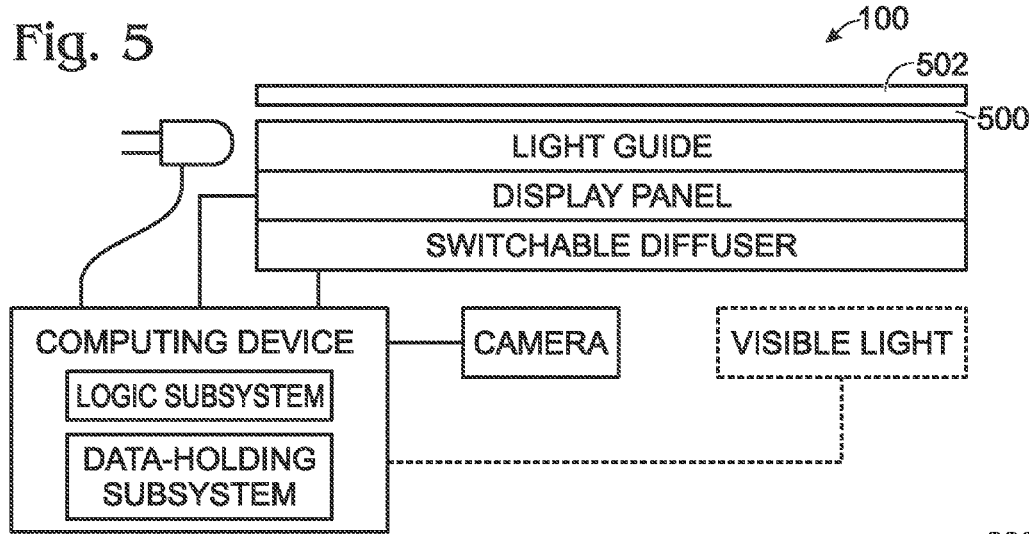
FIG. 5 shows a schematic depiction of an embodiment of an interactive display system comprising a variable diffuser and a protective layer separated from a front light system by a low index gap.

Further, in some embodiments, a material with a low index of refraction, such as a gap filled with air, may be located optically between the protective layer and the light guide. FIG. 5 illustrates a low index gap 500 located between a protective layer 502 and the other optical components of the embodiment of FIG. 1. The term "low index gap" as used herein describes a space between a protective layer and a light guide that is filled with a material, such as air, having a lower index of refraction than the light guide material. Note that for the case of air providing the low index gap, the bottom side of the protective layer may have a slightly roughened or slightly bumpy surface so as to mechanically maintain the gap. This surface may further be an engineered surface having proscribed protrusions disposed across the surface, such as microdots, or microspacers, in order to maintain the low index gap while minimizing or limiting impact of scatter effects on both display and off-surface imaging quality.

Figure 6:
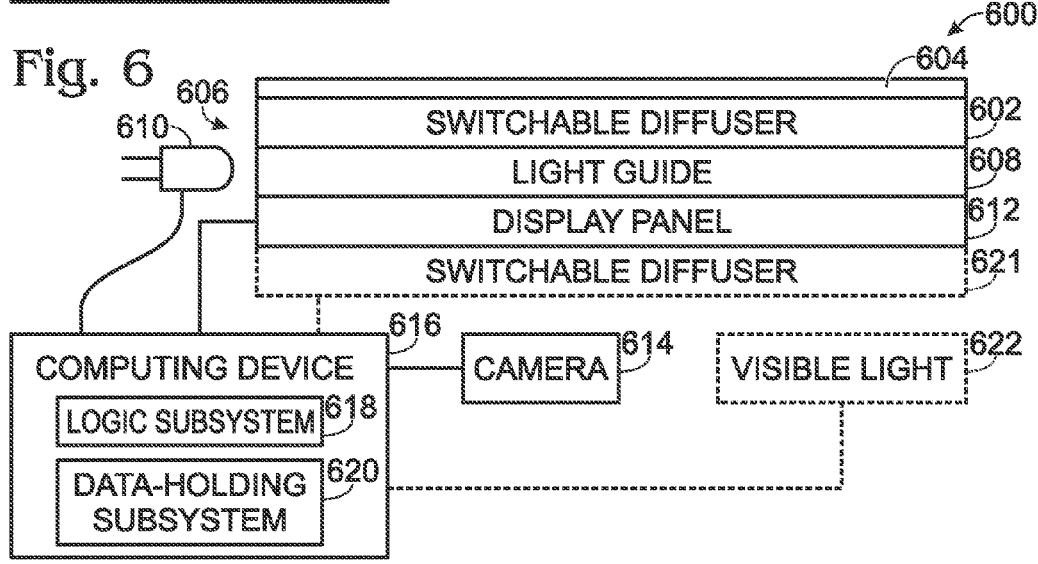
FIG. 6 shows a schematic diagram of another embodiment of an interactive display system comprising a variable diffuser.

In the embodiments of FIGS. 1-5, the variable diffuser is located behind the display panel relative to the position of a viewer, and is placed optically between the display panel and touch detection optics. In other embodiments, a variable diffuser may be located on a same side of the display panel as a viewer. FIG. 6 shows an embodiment of such an interactive display system 600. The interactive display system 600 comprises a variable diffuser 602 covered by a protective layer 604 formed from a thin glass or other material. The protective layer 604 may be laminated to the variable diffuser 602, or joined to the interactive display system 600 in any other suitable manner.

The interactive display system 600 further comprises a front light system 606 comprising a light guide 608 disposed on one side of the display panel, and an illuminant 610, such as an infrared light source or light source, configured to introduce infrared light into the light guide 608. A display panel 612 is positioned beneath the light guide 608 (with reference to the orientation of the device shown in FIG. 6), and an image capture device, such as a camera 614, is disposed on an opposite side of the display panel as the light guide so that it may capture an image of objects touching the protective layer via light scattered by the object through the display panel 612. The interactive display system 600 further comprises a computing device 616 having a logic subsystem 618 and a data-holding subsystem 620 and being in electrical communication with the display panel 612, the variable diffuser 602, the camera 614, and the illuminant 610, as described above with respect to the embodiment of FIG. 1.

Positioning a variable diffuser 602 on an opposite side of the light guide 608 may help to correct for directional effects in vision-based touch detection arising from the use of the light guide 608. As light leaks out of the light guide 608, the path of the leaked light may have a fairly large angle relative to the light guide surface normal. As a result, there may be some shadowing of the light caused by objects on the display, which may affect the detection of the location and the shape of the object. Further, a three-dimensional object placed at a first location on or near interactive surface is illuminated by light near that location for portions of the object close to surface, while portions of that object further away from that surface are illuminated by light emanating from a different location between that location and where illuminant 610 is coupled into the light guide. The use of variable diffuser 602 may help to reduce such directional effects, as the diffusion of leaked light causes the light from the light guide 608 to reach the interactive surface in a in a more even distribution of directions. Likewise, during image display as opposed to image acquisition, the variable diffuser 602 may be switched to a less diffuse state to allow a user to clearly view the display panel 612.

In some embodiments, a second variable diffuser 621 may be disposed optically between the display panel 612 and the camera 614. The second variable diffuser may be used to block a user's view of the camera 614 and other interior components of the interactive display system 600 during display of an image, as described above with regard to the embodiment of FIG. 1. Further, the second variable diffuser 621 may be used in conjunction with a visible light source 622 to provide backlighting for the display panel 612, where the display panel 612 is an LCD panel, also as described above.

Figure 7:
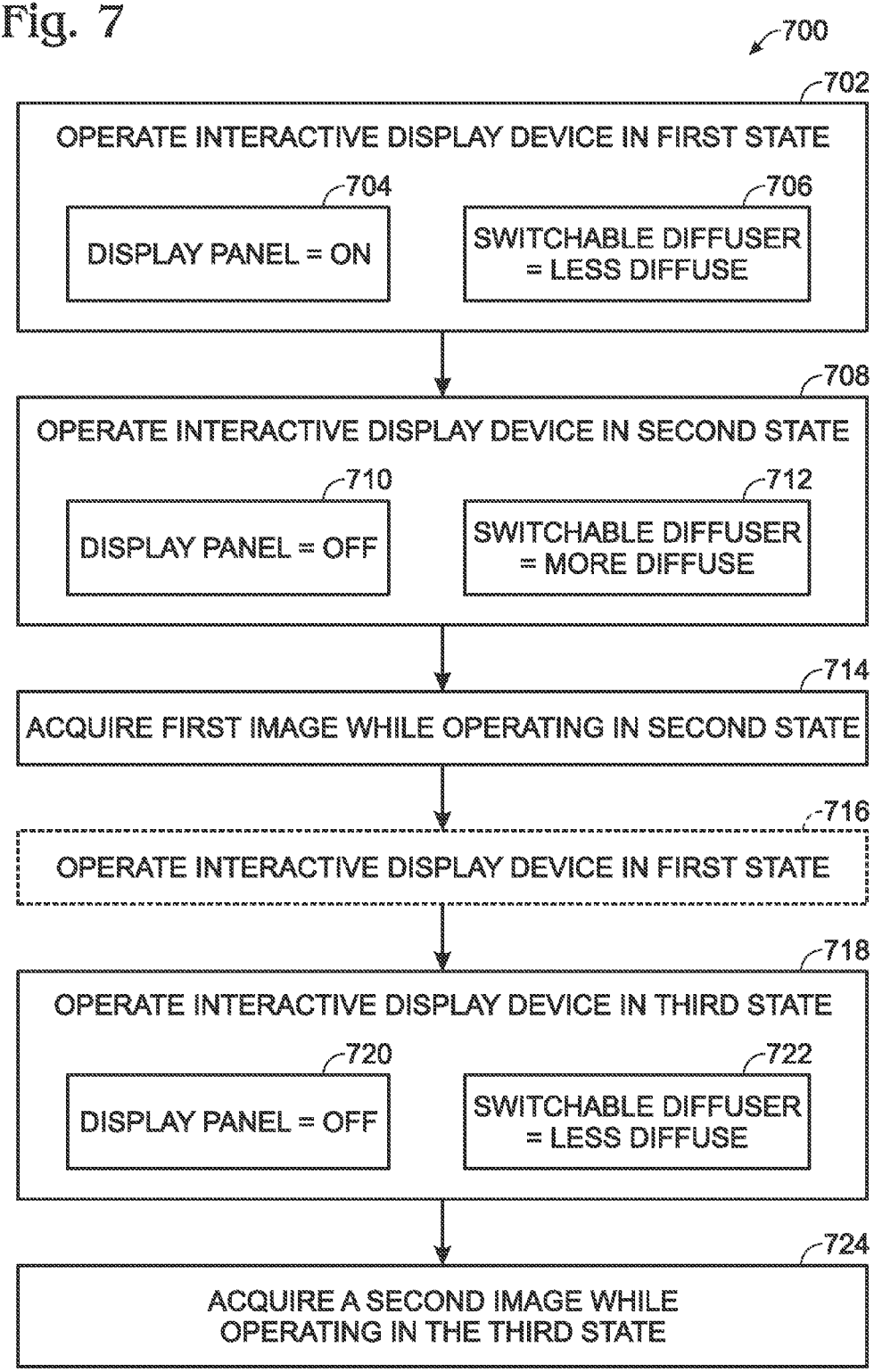
FIG. 7 shows a flow diagram depicting another embodiment of a method of operating an interactive display system comprising a variable diffuser.

FIG. 7 illustrates an embodiment of a method 700 of operating an interactive display device having a variable diffuser disposed on an opposite side of a light guide as a display panel. Method 700 comprises, at 702, operating the interactive display device in a first state in which the display panel is on ("on" indicates that the display panel is displaying an image), as indicated at 704, and the variable diffuser is in a less diffuse state, as indicated at 706. In this state, the display panel may be viewed through the variable diffuser. During this state, the camera and illuminant each may be in an "off" state.

Next, method 700 comprises, at 708, operating the interactive display device in a second state in which the display panel is off ("off" indicates that the display panel is not displaying an image), as indicated at 710, and the variable diffuser is in a more diffuse state, as indicated at 712. During this state, the optical touch detection front light system is in an "on" state. In this state, the variable diffuser diffuses light from the front light system, thereby reducing directional effects when this light is scattered from an object and facilitating the detection of the location and shape of object touching or proximate to the interactive surface. While operating the interactive display device in the second state, method 700 further comprises, at 714, acquiring a first image with the image capture device. To facilitate the image acquisition, the illuminant may be in an "on" state while acquiring the image.

Continuing, method 700 may optionally comprise, at 716, again operating the interactive display device in the first state before operating the interactive display device in a third state at 718, or may proceed directly to the third state without operating again in the first state. In the third state, the display panel is off, as indicated at 720, and the variable diffuser is in a less diffuse state, as indicated at 722. Method 700 further comprises, while operating the interactive display device in the third state, acquiring a second image with the image capture device, as indicated at 724. The first and second images may then be used to distinguish objects touching or closer to the interactive surface of the interactive display device from objects located farther away from the interactive surface, as described above. It will be understood that, in embodiments in which it is not desired to detect objects located above the interactive surface, method 700 may repeat processes 702-714, without performing processes 716-724, as it may be sufficient to acquire "more diffuse" images, without acquiring "less diffuse" images, to detect touch.

In embodiments that detect touch via FTIR events, touch light is coupled out from the light guide when pressure is applied to the interactive surface, thereby bringing the variable diffuser and the light guide into optical contact. Light is scattered by the variable diffuser, and at least some of that light is scattered back through the flat panel display towards the camera. It will be understood that the variable diffuser may have upon it a partial or wavelength selective mirror coating, that is, a coating that preferentially reflects the scattered light from the light-guide back towards the camera.

In embodiments that utilize a "leaky" light guide and that thus do not utilize FTIR to detect touch, because light is scattered from the object touching the interactive surface, such a coating may be omitted. The use of a "leaky" light guide may offer the advantage that a touch input may be detected without touch pressure, such that the user experience is similar to that of a capacitive touch detection mechanism. In such embodiments, the display panel, light guide, and variable diffuser may be laminated together using a low index adhesive. In some non-limiting example embodiments, the adhesive bonding the light guide to the display may have a different, lower refractive index compared to the adhesive bonding the light-guide to the variable diffuser.

Figure 8:
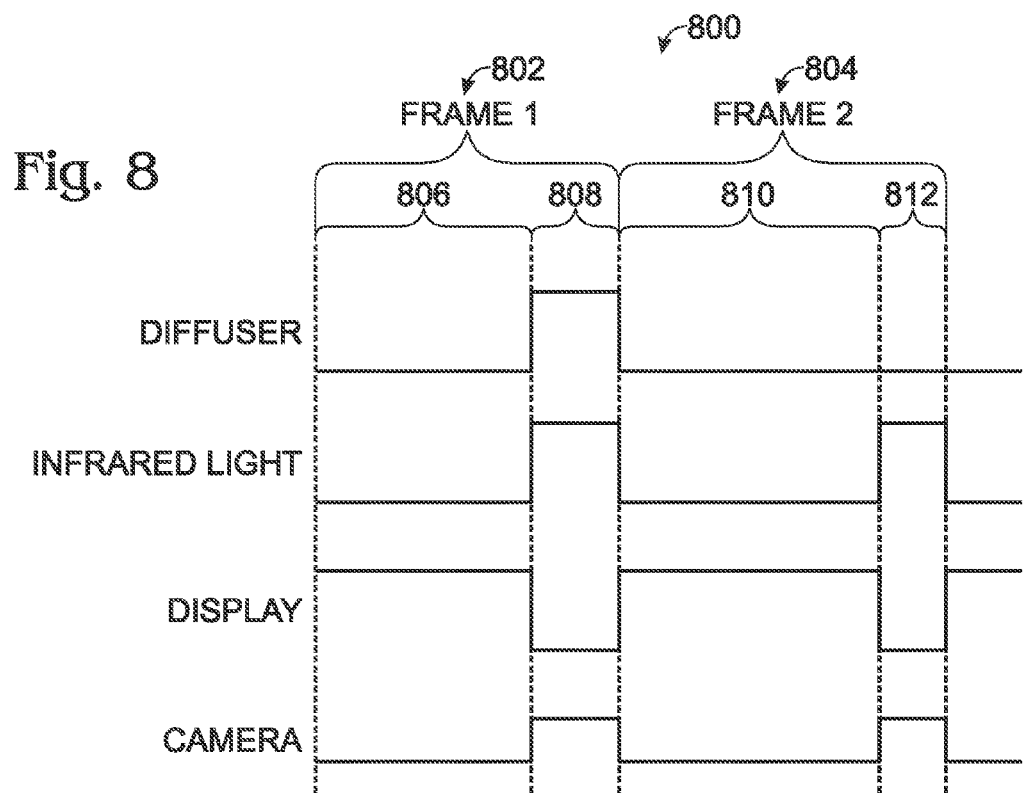
FIG. 8 shows a timing diagram depicting a non-limiting example implementation of the embodiment of FIG. 7.

FIG. 8 shows a timing diagram 800 depicting a more detailed, non-limiting example implementation of method 700. A first display image frame cycle is shown at 802, and a second display image frame cycle is shown at 804. The timing diagram 800 shows relative changes of state of an infrared light that provides light to a front lighting touch detection system, a display panel, a camera, and a first variable diffuser. It will be understood that, in embodiments that utilize a LCD panel, a visible light and a second variable diffuser may be modulated in a similar pattern to that of the display panel.

First referring to the first frame cycle 802, the infrared light and camera are in "off" states for a first portion 806 of the first frame cycle 802, while the display is in an "on" state and the variable diffuser is in a less diffuse state. Thus, the first portion 806 of the first frame cycle 802 displays an image. Next, in a second portion 808 of the first frame cycle 802, the infrared light is in an "on" state, the display panel is in an "off" state, the camera is in an "on" state (i.e. is integrating an image), and the diffuser is in a more diffuse state. Thus, the second portion 808 of the first frame cycle 802 may be used to acquire a more diffuse image of any objects touching or close to the interactive surface.

Next referring to the second frame cycle 804, the infrared light and camera are in "off" states for a first portion 810 of the second frame cycle 804, while the display is in an "on" state and the variable diffuser is in a less diffuse state. Thus, the first portion 810 of the second frame cycle 804 displays an image. Next, in a second portion 812 of the second frame cycle 804, the infrared light is in an "on" state, the display panel is in an "off" state, the camera is in an "on" state, and the diffuser is in a less diffuse state. Thus, the second portion 812 of the second frame cycle 804 may be used to acquire a less diffuse image of any object touching or close to the interactive surface.

Then, the images acquired during the first frame cycle and second frame cycle may be compared to determine whether an object is touching the interactive display surface. Further, as mentioned above, by comparing the gradients between pixels in the two acquired images, a distance of an object above the surface may be determined. It will be understood that, in some embodiments in which it is only desired to detect actual touch events, rather than objects spaced from the interactive surface, the Frame 2 process may be omitted.

The first portion and second portion of each frame cycle of FIG. 8 may have any suitable duration. In one non-limiting example embodiment, the first portion of each frame cycle may comprise 80% of each frame cycle, and the second portion of each frame cycle may comprise 20% of each frame cycle. In this embodiment, the display panel displays an image to a user for 80% of the time. This may lead to an image of satisfactory brightness, yet provide ample time to integrate images of a desired quality when the display screen is in an "off" state.

Figure 9:
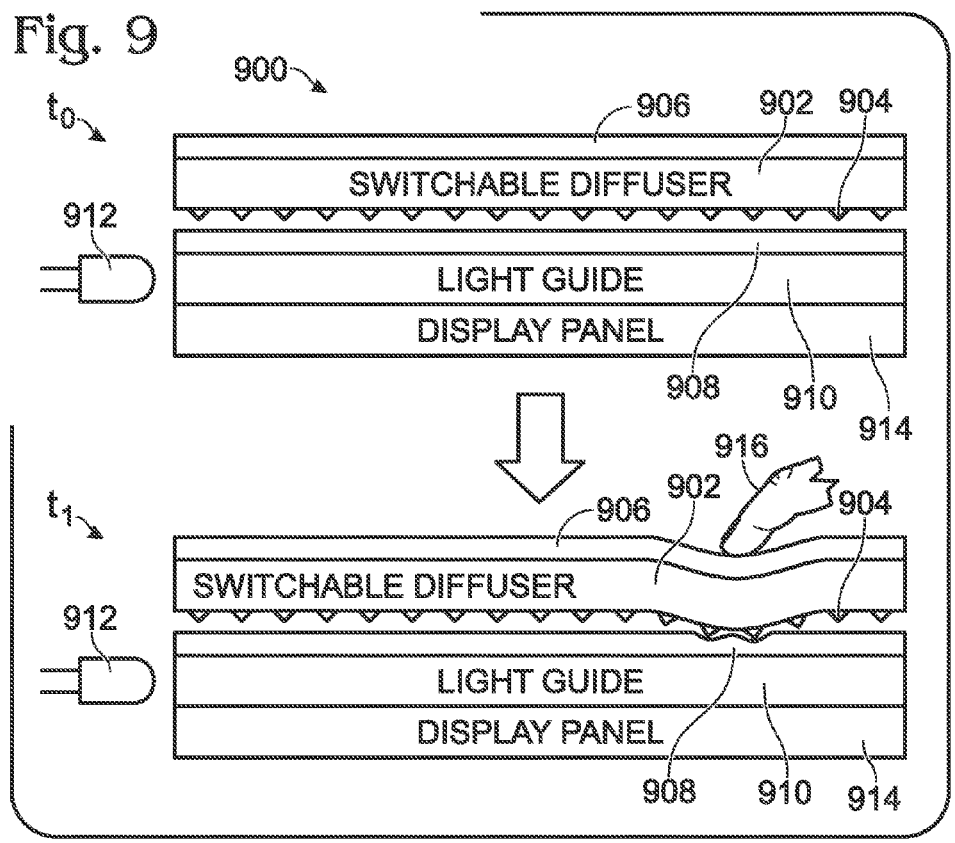
FIG. 9 shows a schematic depiction of another embodiment of an interactive display system comprising a protective layer separated from a front light system by a low index gap.

FIG. 9 shows another embodiment of an arrangement of optical components that comprises a low index gap separating a variable diffuser and a light guide. Optical component arrangement 900 comprises a variable diffuser 902, a protective layer 906, and a plurality of protrusions 904 extending from the variable diffuser into a low index gap between the variable diffuser 902 and a light guide 910. Further, the light guide 910 comprises a deformable layer 908, such as a silicone sheet, forming the other side of the low index gap. An illuminant 912 is configured to introduce light into the light guide 910, and a display panel 914 is located on an opposite side of the light guide 910 as the variable diffuser 902. It will be appreciated that the sizes and scales of the various structures shown in FIG. 9 are exaggerated for the purpose of illustration.

As illustrated at $t_0$ in FIG. 9, in the absence of a touch input, the deformable layer 908 remains separated from the protrusions 904. However, when an object touches the protective layer 906, the protrusions 904 beneath the touch input are pushed into contact with the deformable layer 908, thereby locally deforming the deformable layer 908.

The use of the protrusions 904 in combination with the deformable layer 908 allows significant local deformation of the deformable layer 908 to be achieved with moderate pressure, and thereby helps to effectively provide mechanical gain in the touch sensing system. The resulting curvature of the surface of the deformable layer 908 may cause light to escape from the deformable layer 908 at a glancing angle to the deformable layer surface. The light that escapes the deformable layer 908 is then diffused by the variable diffuser 902, thereby becoming available for touch detection.

The protrusions 904 may have any suitable configuration. For example, in some embodiments, the protrusions may comprise small bumps or prisms. Likewise, the protrusions 904 may be formed in any suitable manner, including but not limited to via extrusion or embossing.

In some embodiments, a guest-host dye may be added to the variable diffuser material. Such a dye may be used to make the variable diffuser material dark in the more diffuse state, thereby reducing the ambient scattered light without affecting the performance of the system in the IR.

Further, in some embodiments, an infrared reflecting filter may be provided as an outermost layer on the interactive surface. This may allow an infrared optical touch detection system to be "sealed" from the outside, allowing vision to detect touch without interference from other infrared sources, such as interior lighting or solar radiation. It will be understood that such a configuration may be used either in an FTIR architecture, "leaky light guide" architecture, or in any other suitable architecture.

As mentioned above, the image sensor, whether a camera or a SIP arrangement, may comprise a 3D image sensor (or "depth sensor"), such as a stereo camera, time-of-flight camera, or structured light depth camera. Such a 3D camera may be able to sense 3D gestures and/or postures above the screen and detect touch events with potentially high accuracy.

Any suitable optics may be used in such a 3D image sensor system, including but not limited to an imaging optical wedge, a reverse rear-projection television imaging system, and a reversed Fresnel-based folded imaging system. For example, some 3D image sensors may have a minimum distance at which depth can be detected. As a more specific example, a time-of-flight depth sensor may have a minimum distance associated with a minimum detectable time lapse between emitting light and detecting the emitted light after reflection by an object. Therefore, the use of an imaging optical wedge through which the 3D image sensor captures an image may help to increase an optical path length to provide a buffer distance between the camera and an object located near the interactive surface. The buffer distance provided by the imaging optical wedge 1002 may allow the 3D image sensor to capture 3D information starting just beyond the interactive surface, and detect 3D information within a field of view and within a distance range up to a maximum distance limit. The term "imaging optical wedge" as utilized herein signifies an optical wedge configured to transfer a focused image between a light input interface and a light output interface of the wedge.

Figure 10:
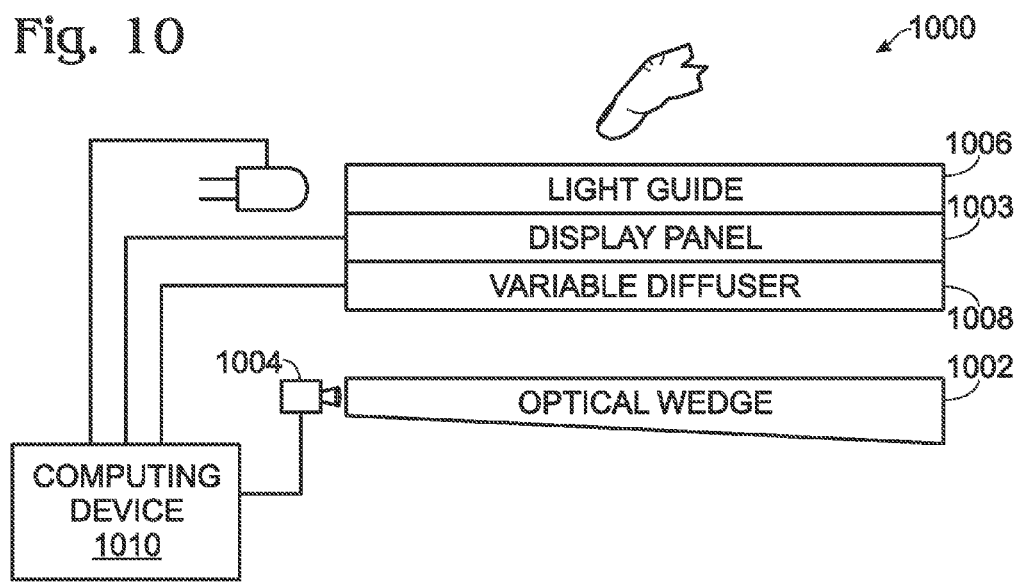
FIG. 10 shows a schematic depiction of another embodiment of an interactive display system configured to detect hover inputs.

FIG. 10 depicts an embodiment of an interactive display device 1000 comprising an imaging optical wedge 1002, a display panel 1003, and a 3D image sensor 1004 configured to capture a depth image of the interactive surface via the optical wedge 1002 to detect a hover input, represented by the finger shown above the interactive surface. Infrared light may be provided by a front light guide 1006, backlighting (e.g. from a source behind the display panel), or in any other suitable manner. Likewise, visible backlighting for a modulating display panel 1003 may be provided in any suitable manner.

It will be understood that the depicted image sensor 1004 may schematically represent any suitable 3D image sensing system, including but not limited to a structured light depth sensor, a stereo depth sensor, and a time-of-flight depth sensor, as well as associated hardware, such as light sources for structured light or time-of-flight depth sensors, two or more cameras of a stereo camera, etc.

In the case of a structured light depth sensor, an infrared or visible structured light pattern projected for depth sensing may be produced in any suitable manner. For example, in some embodiments, the light pattern may be projected through the optical wedge via a laser or other light source located at the same end of the wedge as the image sensor. In other embodiments where a projection image display system is used to display images on the interactive surface, a structured light pattern may be interleaved with frames of a displayed image to project a structured light pattern via the display panel. As a more specific example, in some embodiments, for each displayed image frame, a structured light pattern in the form of an anti-image (e.g. an inverse of the displayed image) may be displayed for a portion of the frame. It will be understood that these methods for projecting a structured light pattern are presented for the purpose of example, and are not intended to be limiting in any manner.

Where the 3D image sensor is a stereo camera used in combination with an imaging optical wedge, it will be understood that touch and hover may be detected and distinguished in various different ways. For example, in some embodiments, images may be acquired by the "left" or first camera and the "right" or second camera of the stereo camera with a variable diffuser 1008 at different diffusivities to acquire touch and/or hover data as described above. Likewise, both cameras of the stereo camera may be used to acquire image data at a same diffusivity, and the stereo data from the stereo camera may be used to determine touch and/or hover from the z-axis component of the stereo data. In this embodiment, the more diffuse state may be utilized to detect touch while the less diffuse state could be used to detect hover via the stereo data. Further, in yet other embodiments, stereo images may be acquired at a same diffusivity, and then the stereo data is used to disambiguate other depth measurements made as described above to achieve a more robust hover determination.

The variable diffuser 1008 also may be used to hide internal structures of the interactive display system by operating in the more diffuse state with the backlight ON, and may switch to a less diffuse state with display off in order to capture images beyond/above the interactive surface. In other embodiments, the variable diffuser 1008 may be omitted.

The interactive display device 1000 further comprises a computing device 1010 configured to control the optical wedge 1002, 3D image sensor 1004, variable diffuser 1008, backlighting system, front lighting system, and/or any other suitable components of interactive display device 1000. Further, the computing device 1010 also may be configured to detect hover inputs by locating objects close to the interactive surface in images captured by the image sensor 1004, for example by detecting a position, posture, motion, etc. of the object, and to display a response to the hover input via the display panel 1003. It will be understood that the computing devices for the embodiments described below may perform similar functions as described for the interactive display device of FIG. 10. It will also be understood that the computing device 1010 and the computing devices of other embodiments described below each comprises a logic subsystem configured to execute instructions, a data-holding subsystem configured to store executable instructions, and also may comprise any other suitable components.

Figure 11:
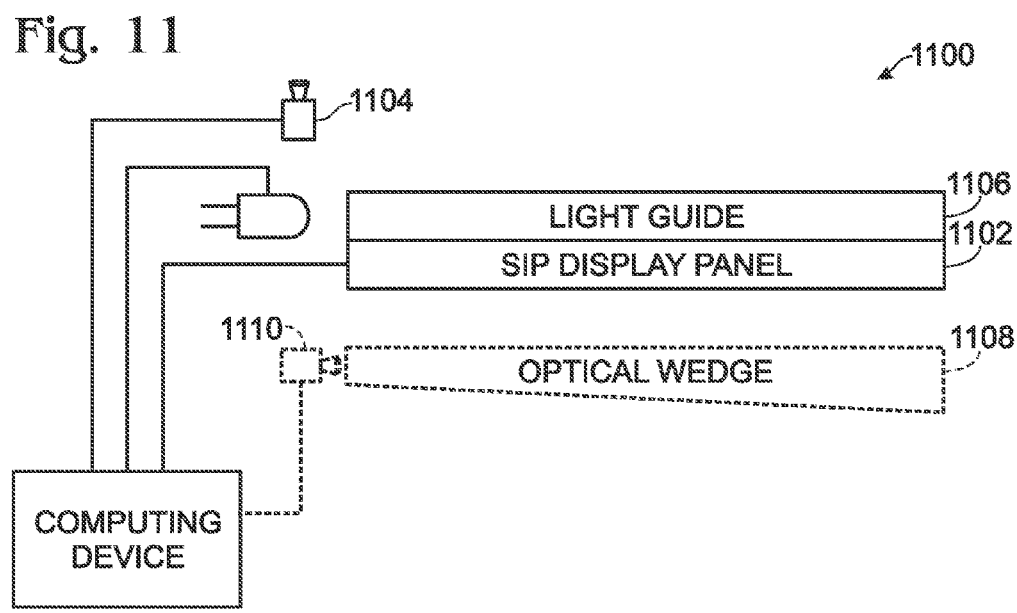
FIG. 11 shows a schematic depiction of another embodiment of an interactive display system configured to detect hover inputs.

As mentioned above, some embodiments may employ two or more image capture devices to detect hover and/or touch. For example, FIG. 11 depicts an embodiment of an interactive display system 1100 that utilizes a SIP display panel 1102 to capture images of objects within a first distance range in close proximity to an interactive surface, and a 3D sensor 1104 to capture three-dimensional content farther from the interactive surface. In this manner, the SIP sensor array may detect touch and near-touch inputs, while the 3D image sensor may detect hover inputs. In some embodiments, the SIP sensor array may be replaced by a capacitive touch sensor to detect touch and near-touch events, a resistive touch sensor, or any other suitable touch sensor. As depicted, the 3D image sensor 1104 may be positioned adjacent to the display panel 1102 such that images are not captured through the SIP display panel 1102. For example, the 3D image sensor may be contained within a bezel or frame of the interactive display device 1100, or may have any other suitable location. In other embodiments, as indicated in dashed lines in FIG. 11, a 3D sensor 1110 may acquire an image through the SIP display panel 1102 via an optical wedge 1108 as a distance buffer to facilitate the acquisition of 3D data relatively close to the interactive surface, as described above for FIG. 10. It will be understood that such embodiments may employ a variable diffuser (not shown in FIG. 11) as described above.

Similarly, in other embodiments, a two-sensor image sensing system may also utilize a 2D wedge-based imaging system in conjunction with a SIP sensor array. Touch may be detected by the sensor array within the SIP panel, with IR light being provided by a front light guide 1106, backlighting (e.g. from a source behind the display panel), or in any other suitable manner. Likewise, hover may be detected via the 2D wedge-based system via use of a variable diffuser, as described above.

Figure 12:
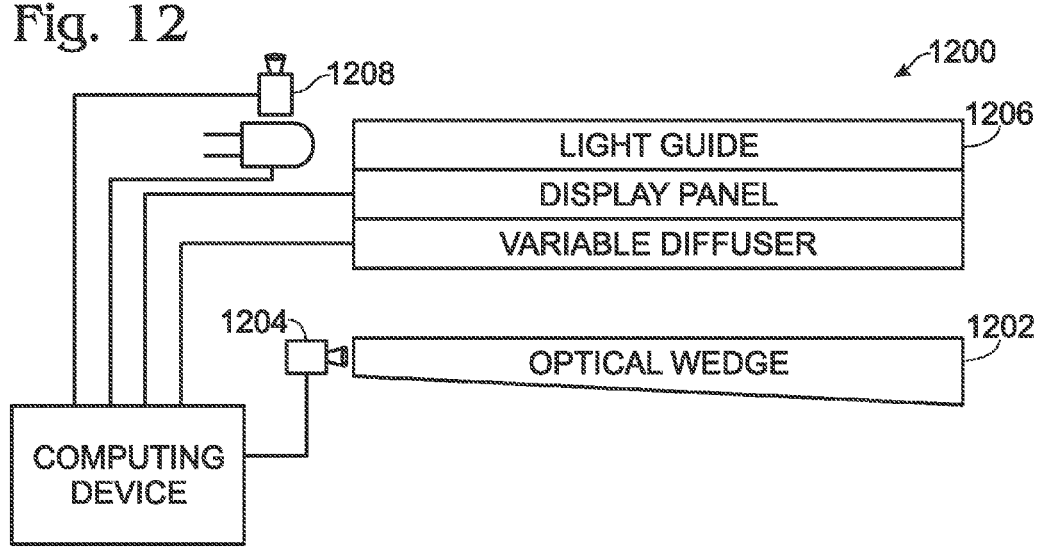
FIG. 12 shows a schematic depiction of another embodiment of an interactive display system configured to detect hover inputs.

FIG. 12 depicts another embodiment of an interactive display device 1200 that employs an imaging optical wedge 1202 in combination with a 2D image sensor 1204 to capture images in close proximity to an interactive surface 106, and a 3D image sensor 1208 located adjacent to the interactive surface to capture three-dimensional content spaced farther from the interactive surface 1206. This may allow the interactive display 1200 device to utilize the 2D image sensor 1202 to image objects within a first, closer range of distances (e.g. approximately eighteen inches) from the interactive surface 1206, and the 3D image sensor 1208 to image objects within a second, farther range of distances (e.g. farther than eighteen inches) from the interactive surface 1206. Thus, touch inputs as well as hover inputs within the first range of distances may be detected via images received from the first image sensor (in some embodiments, in combination with a variable diffuser), and hover inputs within the second range of distances may be detected via images received from the second image sensor. While FIG. 12 depicts a variable diffuser located behind the display panel, it will be understood that other embodiments may not utilize a variable diffuser.

Figure 13:
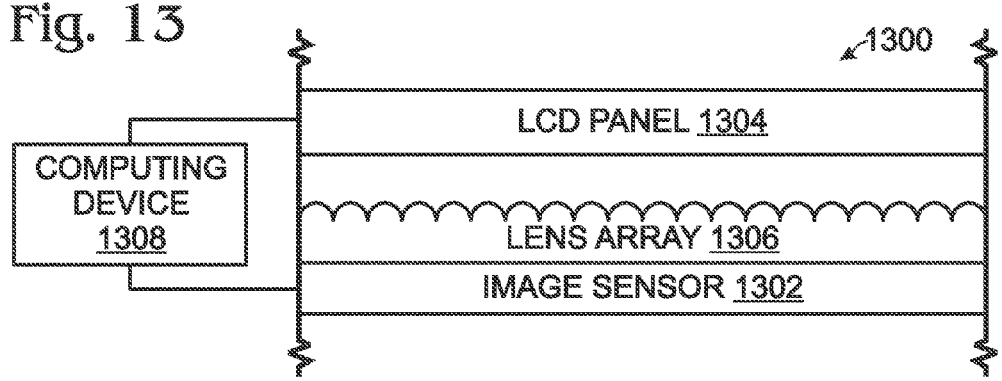
FIG. 13 shows a schematic depiction of an embodiment of a sensor-in-pixel display panel configured to detect hover inputs.

Hover also may be detected in embodiments that utilize a single image sensor via optics configured to allow different pixels of an image sensor to capture images of an object at different perspectives. In this manner, a stereo image of an object may be constructed via portions of an image from a single image sensor. FIG. 13 shows a schematic depiction of an embodiment of a SIP display panel 1300 for use with an interactive display device, wherein the display panel 1300 comprises a large-format image sensor 1302 located behind an image-producing element 1304, such as a spatial light modulator or emissive display. The term "large format image sensor" denotes a sensor with the same or similar dimensions as the image-producing element 1304. Further, a lens array 1306 is disposed between the spatial light modulator 1304 and the large-format image sensor 1302. The lens array 1306 is configured to focus different perspectives of an object on different portions of the large-format image sensor 1302, thereby allowing a stereo image to be constructed from two or more sub-areas of an image acquired by the large-format image sensor 1302.

The image-producing element 1304 and the large-format image sensor 1302 may be in communication with a computing device 1308 configured to control the image-producing element 1304 and the large-format image sensor 1302. Further, the computing device 1308 also may be configured to construct a stereo image from portions of an image acquired via large-format image sensor 1302, to detect a hover input from the stereo image, and to display a response to the hover input via the image-producing element 1304. In the depicted embodiment, the lens array 1306 is separated from the image-producing element 1304 via a gap, but it will be understood that the lens array 1306, the image-producing element 1304, and the large-format image sensor 1302 may have any suitable positional and structural relations to one another.

Further, as an example, while stereo images provide a fundamental capability to determine hover distance, it may be possible to achieve such effect with a one-dimensional microlens array, such as a lenticular array, where the lenticular pitch may span on order of two pixels of the imager. In such manner, the resolution of the image is half the native resolution in one dimension yet remains full resolution in the other dimension. In order to achieve higher angular spread between stereo images, the focal length of the lenslets in the array, which may be substantially close to the separation distance between the imager and array, may be reduced. However, since the sensing pixels have finite width, they will image a minimum angle of subtend. In order to refine and limit this angular subtend, the ratio of pixel width to pixel pitch may be reduced, such as by additional spacing between pixels and or aperturing of pixels for a given pixel spacing. The same effect can be achieved by simply not using some of the pixel columns or rows for the purposes of the two stereo images, thereby achieving the reduced ratio of pixel width to pixel pitch. Further, it should be noted that while use of a 1-dimensional array may provide the information to determine hover distance due to image offset between the stereo images, a two-dimensional microlens array may further be used to achieve probing of angle image space. In such case, images having pointing in crossed angular dimensions from surface normal may be formed, such a quad images (i.e., stereo in two angular probing dimensions).

While the concept discussed here utilizes a lens array disposed between the LCD panel and image sensor, it may be desirable to achieve similar function without separation of the LCD and large-format image sensor. For example, it may be desirable to utilize a SIP panel for both display and imaging since such system includes both function of display and imaging in a single panel, but placement of a lens array, having pitch larger than the display pixel pitch, on top of the panel may result in degrading the performance of the display. By making the lens array reflective for IR and transparent for visible, and placing such IR-reflective lens array behind the SIP panel having IR sensors which are sensitive only to IR light, such that the separation distance is set substantially near the focal distance of the reflective lens array, stereo imaging may be realized without significant compromise to the display performance. Such effect may be achieved for stereo in one dimension or multiple probing directions using a two-dimensional IR-reflective/Visible-transmissive lens array. Further, the lens array could be embedded in media having matching refractive index to further diminish any artifacts which might be induced by the lens array on display performance. In so doing, probing of stereo, or more, images from a SIP panel having sensor elements sensitive to light entering the bottom side of the panel, instead of the top side, may be achieved in a single panel with substantially low impact on display performance. It will be appreciated that since the lens array is reflective for IR, the IR illumination used to illuminate objects may be placed in front of the display panel. This could be provided by illumination from within the bezel of the panel, such that objects rescatter some portion of light into the acceptance of the stereo imaging cones. As an alternative, a 'leaky' frontlight having an angular selective response between transmission and reflection, such that high angles are reflected and low angles from surface normal are transmitted, may be used for illumination. Such angular response may be achieved using multilayer dielectric optical coatings.

Figure 14:
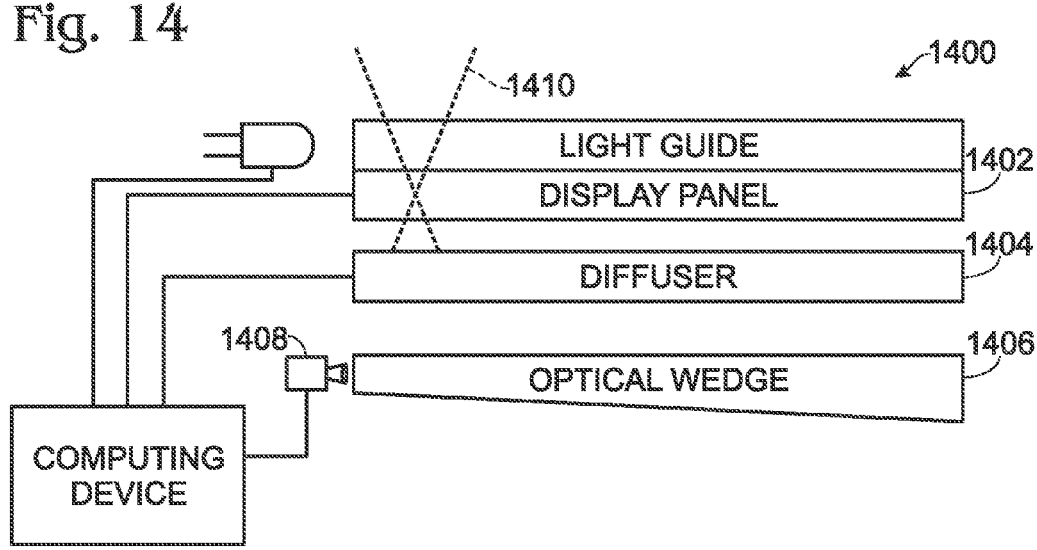
FIG. 14 shows a schematic depiction of another embodiment of an interactive display system configured to detect hover inputs.

FIG. 14 shows a similar embodiment, in which an interactive display device 1400 comprises a modulating display panel 1402, a diffuser 1404 (which may or may not be variable) located behind the modulating display panel 1402, and an optical wedge 1406 located behind the diffuser 1404. Further, an image sensor 1408 is configured to capture an image of the diffuser 1404 through the optical wedge 1406. In this embodiment, the modulating display panel 1402 may be configured to periodically (e.g. for a portion of each frame or once per a predetermined number of frames) form a plurality of pinhole apertures via the modulating display panel 1402, such that only a narrow cone of light 1410 passes through each pinhole aperture defined by the modulating display panel. In this configuration, each pinhole aperture defined by the modulating display panel 1402 acts as a pinhole camera, focusing an image on the diffuser 1404, thereby allowing images of different perspectives of an object to be focused on different portions of the diffuser 1404. The image sensor 1408 may then capture an image of the diffuser through the optical wedge 1406, and a stereo image of the object may be constructed from the different perspectives of the object in the acquired image. It will be understood that image display may be multiplexed with image acquisition. It should be noted that the pinhole size may be sized appropriately to for a desired level of contrast in the presence of diffraction for the given wavelength to be used for pinhole imaging. Further, for the case of using near IR light for imaging, the array of pinholes may be spaced far enough apart so as to minimize contrast loss from scattered light, so as to allow a tiling of pinhole camera images with each image substantially centered around the pinhole for that image tile. In the scenario where the pinhole array is located between the panel cells and the display backlight, the pinhole array may have a matrix which is opaque or reflective for IR and transparent for visible display light. In so doing, display light may be illuminated at the same time as providing control of the IR light to enable pinhole camera type of imaging. While it may seem the concept can be carried into the visible range by toggling between a sparse aperture array image and the display image, perhaps with anti-image compensation, such a scenario may offer no control of the minimum size aperture, as the RGB cells in the display panel define the quality of imaging limit. One limit of such systems may include limited efficiency due to pinhole transmission fill factor and further loss due to angular spread of screen light exit solid angle.

Figure 15:
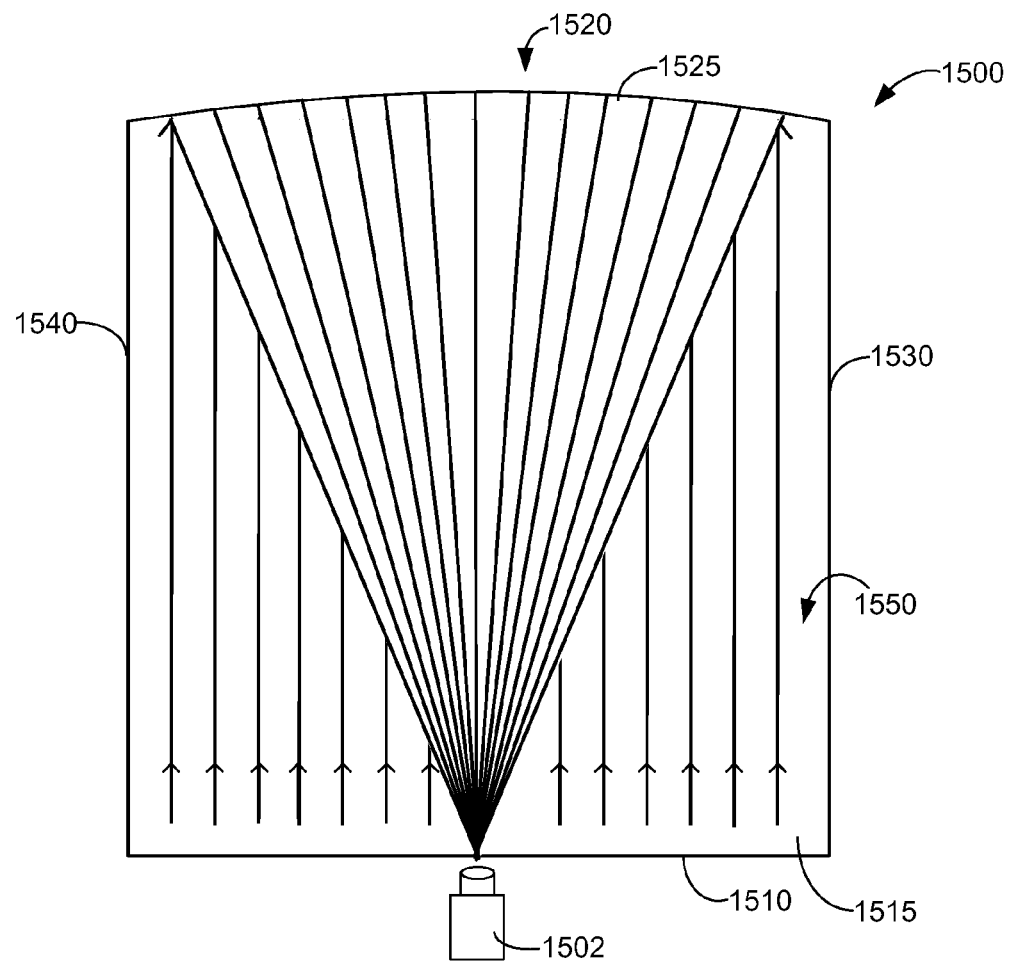
FIG. 15 shows a schematic, plan view showing an embodiment of an optical wedge in accordance with an embodiment of the present disclosure.

Various embodiments described above utilize an optical wedge to transfer images of objects touching and/or hovering above an interactive surface to an image sensor. FIGS. 15-18 illustrate example embodiments of optical wedges. First, FIG. 15 shows an example optical wedge 1500 that may be configured to transfer an image to an image sensor 1502 disposed adjacent to a thin end 1510 of optical wedge 1500, as shown by the ray traces in FIG. 15. The term "viewing surface" indicates that viewing surface 1550 is closer to a viewer than a back surface (not visible in FIG. 15) which is opposite of viewing surface 1550. Each of the viewing and back surfaces is bounded by sides 1530 and 1540, thin end 1510, and thick end 1520. In FIG. 15, viewing surface 1550 faces a viewer of the page and the back surface is hidden by this view of optical wedge 1500.

Optical wedge 1500 is configured such that parallel light rays entering viewing surface 1550 at a critical angle of reflection are focused by end reflector 1525 and delivered to image capture device 1502 via total internal reflection. In this embodiment, end reflector 1525 is curved, with a uniform radius of curvature having center of curvature 1572, and image sensor 1502 is positioned at the focal point of end reflector 1525, the focal point being at one half the radius of curvature. In various embodiments, end reflector 125 may be toriodal, parabolic, or have other suitable curvature for collimating light.

Figure 16:
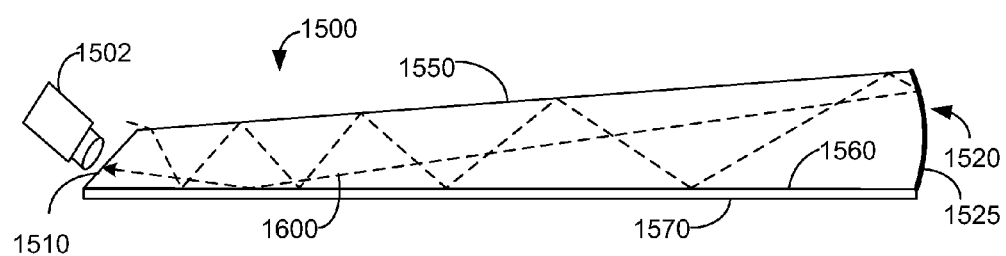
FIGS. 16 and 17 show ray traces through a sectional view of the embodiment of FIG. 15.
Figure 17:
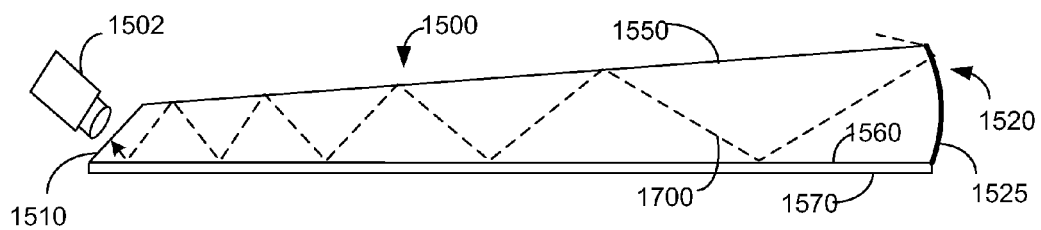

FIGS. 16 and 17 show ray traces through a schematic cross-sectional view of optical wedge 1500. FIG. 16 shows the path of a first ray 1600 through optical wedge 1500, and FIG. 17 shows the path of a second ray 1700 through optical wedge 1500, wherein rays 1600 and 1700 represent rays located at opposite sides of a cone of light received by image sensor 1502. As can be seen in FIGS. 16 and 17, ray 1600 enters viewing surface 1550 adjacent to thin end 1510 of optical wedge 1500, while ray 1700 exits viewing surface 1550 adjacent to thick end 1520 of optical wedge 1500.

Rays 1600 and 1700 enter viewing surface 1550 at an angle less than or equal to a critical angle of internal reflection with respect to a normal of viewing surface 1550. This critical angle may be referred to herein as the "first critical angle." Likewise, rays reflect internally in optical wedge 1500 when the rays intersect viewing surface 1550 at an angle greater than the first critical angle of internal reflection with respect to the normal of viewing surface 1550. Further, rays reflect internally in optical wedge 1500 when the rays intersect back surface 1560 at an angle greater than a critical angle of internal reflection with respect to the normal of back surface 1560. This critical angle may be referred to herein as the "second critical angle."

It may be desirable for the first critical angle and the second critical angle to be different, such that light incident on back surface 1560 at the first critical angle is reflected back toward viewing surface 1550. This may help to prevent loss of light through the back surface 1560, and therefore may increase the optical efficiency of the optical wedge 1500. The first critical angle is a function of the refractive index of optical wedge 1500 and the index of refraction of the material interfacing viewing surface 1550 (e.g. air or a layer of a cladding), while the second critical angle is a function of the refractive index of optical wedge 1500 and the material adjacent to back surface 1560. In some embodiments, such as that shown in FIGS. 16-17, a layer of cladding 1570 may be applied only to back surface 160, such that viewing surface 1550 interfaces with air. In other embodiments, viewing surface 1550 may comprise a layer of cladding (not shown) with a different refractive index than back surface 1560.

Any suitable material or materials may be used as cladding layers to achieve desired critical angles of internal reflection for the viewing and/or back surfaces of an optical wedge. In an example embodiment, optical wedge 1500 is formed from polymethyl methacrylate, or PMMA, with an index of refraction of 1.492. The index of refraction of air is approximately 1.000. As such, the critical angle of a surface with no cladding is approximately 42.1 degrees. Next, an example cladding layer may comprise Teflon AF (EI DuPont de Nemours & Co. of Wilmington, Del.), an amorphous fluoropolymer with an index of refraction of 1.33. The critical angle of a PMMA surface clad with Teflon AF is 63.0 degrees. It will be understood that these examples are described for the purpose of illustration, and are not intended to be limiting in any manner.

In other embodiments, back surface 1560 may include a mirror. As non-limiting examples, the mirror may be formed by applying a reflective coating to back surface 1560 or by placing a mirror adjacent to back surface 1560. In this manner, back surface 1560 may reflect incident light intersecting back surface 1560. When back surface 1560 is configured to reflect some or all incident light, back surface 1560 may be referred to herein as the "reflective back surface." Non-limiting examples of a reflective back surface include a back surface having a mirrored surface, a mirror placed adjacent to the back surface, a back surface having a second critical angle of internal reflection with respect to a normal of the back surface, wherein the second critical angle of reflection is less than the first critical angle of reflection, or any other configuration in which the back surface is reflective to internally incident light at the first critical angle of internal reflection.

End reflector 1525 may comprise a faceted lens structure configured to change the ray angle relative to a normal to each of viewing surface 1550 and back surface 1560. In addition, the diminishing thickness of optical wedge 1500 from thick end 1520 to thin end 1510 causes ray angles to increase relative to the normal of each surface as rays entering the viewing surface travel from viewing surface 1550 toward the end reflector 1525.

In some embodiments, image sensor 1502 may be positioned at a focal point of end reflector 1525. In such embodiments, end reflector 1525 may be curved with a radius of curvature that is twice the length of optical wedge 1500. In the embodiment of FIGS. 16-17, the taper angle of optical wedge 1500 is configured so that the corner at thick end 1520 and viewing surface 1550 comprises a right angle and the corner at thick end 1520 and back surface 1560 comprises a right angle. When thin end 1510 is at the focal point of end reflector 1525, thin end 1510 is one half the thickness of thick end 1520. In other embodiments, each of these structures may have any other suitable configuration.

In the depicted embodiment, end reflector 1525 is toriodally curved, or has other suitable curvature from side 1530 to side 1540 and from viewing surface 150 to back surface 160 to be capable of imaging. In other embodiments, end reflector 1525 may be cylindrically curved with a uniform radius of curvature from viewing surface 1550 and back surface 1560 and a center of curvature where viewing surface 1550 and back surface 1560 would meet if extended. A cylindrically curved end reflector may have less sag than a spherically curved end reflector 1525, which may be beneficial in large format applications. Other suitable curvatures may be used for end reflector 1525, such as parabolic or spherical curvature, for example. Additionally, the curvature of end reflector 1525 in the plane perpendicular to sides 1530 and 1540 may differ from the curvature of end reflector 1525 in the plane parallel to sides 1530 and 1540.

It should be appreciated that FIGS. 15-17 are nonlimiting. In other embodiments, a differently configured optical wedge may be utilized. For example, instead of utilizing the above-described optical wedge having folded optics with an end reflector, an optical wedge having continuous optics may be utilized in some embodiments. Such optical wedges having continuous optics may be easier to manufacture than the above-mentioned wedges utilizing folded optics.

Figure 18:
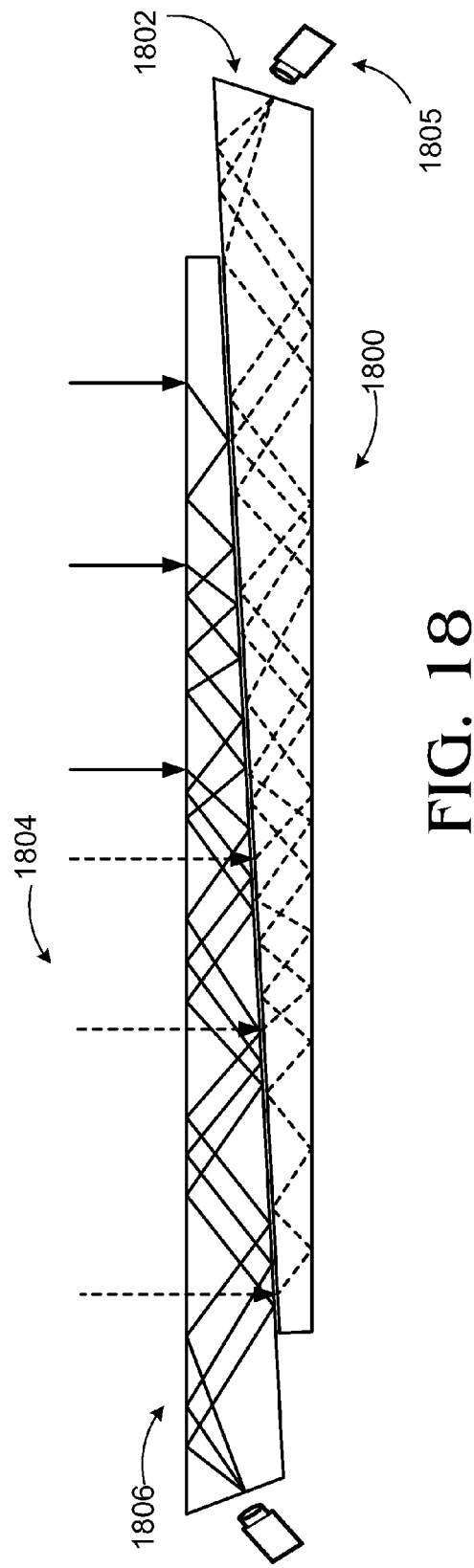
FIG. 18 shows another example optical wedge in accordance with an embodiment of the present disclosure.

FIG. 18 illustrates an example optical wedge 1800 having continuous optics. Light rays 1804 entering a viewing surface of the optical wedge 1800 travel toward the thick end 1802 via total internal reflection for detection via image sensor 1805. While the depicted embodiment shows light rays entering the wedge at an angle normal to the wedge surface, it will be understood that light rays enter the wedge at a critical angle of reflection. It will further be understood that a turning film or the like may be used to redirect light into the viewing surface of the optical wedge 1800.

Due to the wedge geometry of optical wedge 1800, parallel light rays entering the narrower part of optical wedge 1800 travel to the thick end of the wedge. Thus, optical wedge 1800 may be stacked with another optical wedge 1806 in order to image the entire interactive surface of an interactive touch display for detection of touch inputs, and an additional image sensor(s) may be used to capture an image of the portion of the interactive surface imaged by optical wedge 1806. The optical wedges may be positioned "nose to tail" (e.g., thin end of optical wedge 1800 may be positioned adjacent the thick end of optical wedge 1806). In the illustrated stacked configuration, optical wedge 1800 is positioned so as to look through the non-imaging region of optical wedge 1806.

It is to be understood that the configurations and/or approaches described herein are presented for the purpose of example, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An interactive display device, comprising:
   a display panel configured to display an image on an interactive surface;
   an imaging optical wedge disposed adjacent to the display panel;
   an image sensor configured to capture an image of an object located in front of the interactive surface and spaced from the interactive surface by capturing the image through the imaging optical wedge and the display panel;
   a variable diffuser comprising a diffusivity that is controllable between two or more states;
   a logic subsystem; and
   a data-holding subsystem comprising instructions executable by the logic subsystem to receive one or more images from the image sensor, detect a hover input based upon the one or more images received from the image sensor, distinguish blur arising due to hover distance from blur arising due to motion by deconvoluting the image using a predetermined diffusivity profile, and display a response to the hover input via the display panel.

2. The interactive display device of claim 1, wherein the image sensor comprises a three-dimensional image sensor.

3. The interactive display device of claim 2, wherein the three-dimensional image sensor comprises a time-of-flight depth sensor.

4. The interactive display device of claim 2, wherein the three-dimensional image sensor comprises a stereo camera system comprising two or more image sensors.

5. The interactive display device of claim 4, wherein the instructions are executable to acquire images with a first image sensor and a second image sensor of the stereo camera system at different diffusivities.

6. The interactive display device of claim 4, wherein the instructions are executable to acquire images with a first image sensor and a second image sensor of the stereo camera system at a same diffusivity.

7. The interactive display device of claim 2, wherein the three-dimensional image sensor comprises a structured light depth sensor.

8. The interactive display device of claim 7, wherein the structured light depth sensor is configured to project a structured light pattern through the imaging optical wedge.

9. The interactive display device of claim 7, wherein the structured light depth sensor is configured to project a structured light pattern via the display panel.

10. The interactive display device of claim 1, further comprising a diffuser positioned between the imaging optical wedge and the display panel, wherein the liquid crystal display panel is a modulating display panel, and wherein the instructions are executable to form a plurality of apertures via the display panel to focus a plurality of images on the diffuser and to capture an image of the diffuser through the optical wedge.

11. The interactive display device of claim 1, wherein the image sensor is a first image sensor, and further comprising a second image sensor located such that images are not captured through the display panel, wherein the first image sensor is configured to detect objects in a first, closer range of distances from the interactive surface, and wherein the second image sensor is configured to detect objects in a second, farther range of distances from the interactive surface.

12. The interactive display device of claim 1, wherein the instructions are executable to acquire images at a plurality of different diffusivities to determine a distance of an object from the interactive surface.

13. The interactive display device of claim 1, wherein the instructions are executable to acquire images at a plurality of different diffusivities to determine a three-dimensional configuration of an object positioned on or above the interactive surface.

14. The interactive display device of claim 1, wherein the instructions are executable to compare a gradient determined from deconvolution of the acquired image to expected range of gradients and assigning higher merit to gradients in the expected range.

15. The interactive display device of claim 1, wherein the instructions are executable to distinguish blur arising from hover distance from blur arising from motion based on the gradient determined from deconvolution of the acquired image.

* * * * *